(12) United States Patent
Kumar et al.

(10) Patent No.: US 11,205,041 B2
(45) Date of Patent: Dec. 21, 2021

(54) WEB ELEMENT REDISCOVERY SYSTEM AND METHOD

(71) Applicant: Anil Kumar, Chicago, IL (US)

(72) Inventors: Anil Kumar, Chicago, IL (US); Ameet Deshpande, Bangaluru (IN); Rohith Nair, Bangaluru (IN)

(73) Assignee: Anil Kumar, Chicago, IL (US)

( * ) Notice: Subject to any disclaimer, the term of this patent is extended or adjusted under 35 U.S.C. 154(b) by 0 days.

(21) Appl. No.: 16/541,565

(22) Filed: Aug. 15, 2019

(65) Prior Publication Data

US 2021/0049234 A1 Feb. 18, 2021

(51) Int. Cl.
| | |
|---|---|
| *G06F 40/194* | (2020.01) |
| *G06F 16/958* | (2019.01) |
| *G06F 40/14* | (2020.01) |
| *G06F 40/117* | (2020.01) |
| *G06F 40/221* | (2020.01) |
| *G06F 40/284* | (2020.01) |

(52) U.S. Cl.
CPC .......... *G06F 40/194* (2020.01); *G06F 16/986* (2019.01); *G06F 40/117* (2020.01); *G06F 40/14* (2020.01); *G06F 40/221* (2020.01); *G06F 40/284* (2020.01)

(58) Field of Classification Search
CPC ...... G06F 40/14; G06F 40/154; G06F 40/186; G06F 16/81; G06F 40/117; G06F 40/194; G06F 40/221; G06F 40/284; G06F 16/986
See application file for complete search history.

(56) References Cited

U.S. PATENT DOCUMENTS

| | | |
|---|---|---|
| 6,859,922 B1 | 2/2005 | Baker et al. |
| 7,242,587 B2 | 7/2007 | Bohlin et al. |
| 7,343,587 B2 | 3/2008 | Moulden et al. |
| 7,958,295 B1 | 6/2011 | Lia et al. |
| 7,958,495 B2 | 6/2011 | Kelso |
| 8,423,962 B2 | 4/2013 | Becker |
| 8,631,384 B2 | 1/2014 | Marella |
| 8,826,084 B1 | 9/2014 | Gauf |
| 9,026,853 B2 | 5/2015 | Zemer et al. |

(Continued)

OTHER PUBLICATIONS

Homes; Practical UI Test Automation—Locators and Asynchronous Loading, URL: https://www.red-gate.com/simple-talk/dotnet/asp-net/practical-ui-test-automation-locators-and-asynchronous-loading/.

(Continued)

*Primary Examiner* — Chau T Nguyen
(74) *Attorney, Agent, or Firm* — Erickson Law Group, PC

(57) ABSTRACT

A system and method of identifying a changed element within a target web page is disclosed. A pre-region longest matching segment of the pre-region that matches a pre-region segment of a pre-region of a source web page is identified within a pre-region of the target page. A post-region longest matching segment of the post-region that matches a post-region segment of the post-region of a source web page is identified within a post-region of the target page. The changed element in the target web page is identified that is between the pre-region longest matching segment and the post-region longest matching segment in response to the pre-region longest matching segment being determined to be within a pre-defined distance of the post-region longest matching segment.

33 Claims, 32 Drawing Sheets

(56) References Cited

U.S. PATENT DOCUMENTS

| | | |
|---|---|---|
| 9,069,904 B1 | 6/2015 | Cohen et al. |
| 9,111,041 B1 | 8/2015 | Zhang |
| 9,189,377 B1 | 11/2015 | Arkadyev |
| 9,201,768 B1 | 12/2015 | Alon et al. |
| 9,201,772 B1 | 12/2015 | Cohen et al. |
| 9,201,774 B1 | 12/2015 | Cohen et al. |
| 9,317,404 B1 | 4/2016 | Cohen et al. |
| 9,355,016 B2 | 5/2016 | Baril et al. |
| 9,372,787 B2 | 6/2016 | Saar |
| 9,489,289 B2 | 11/2016 | Hu et al. |
| 9,632,921 B1 | 4/2017 | Yamini |
| 9,697,110 B1 | 7/2017 | Arkadyev |
| 9,767,000 B1 | 9/2017 | Chida et al. |
| 9,864,655 B2 | 1/2018 | Patnaik et al. |
| 9,934,134 B2 | 4/2018 | Cohen et al. |
| 2005/0203717 A1 | 9/2005 | Parimi |
| 2007/0220341 A1 | 9/2007 | Apostoloiu |
| 2009/0300056 A1* | 12/2009 | Fu .................... G06F 16/8373 |
| 2011/0088014 A1 | 4/2011 | Becker et al. |
| 2012/0042210 A1 | 2/2012 | Glaser |
| 2012/0151448 A1 | 6/2012 | Becker et al. |
| 2013/0004087 A1* | 1/2013 | Kumar ............... G06F 11/3688 |
| | | 382/218 |
| 2013/0014002 A1* | 1/2013 | Cai ..................... G06F 16/80 |
| | | 715/234 |
| 2013/0055028 A1 | 5/2013 | Patil |
| 2013/0132774 A1 | 5/2013 | Somendra |
| 2014/0109051 A1 | 4/2014 | Mcdonald et al. |
| 2014/0033179 A1 | 12/2014 | Gustus |
| 2014/0380281 A1 | 12/2014 | McLaughlin |
| 2015/0007146 A1 | 1/2015 | Li et al. |
| 2015/0193399 A1* | 7/2015 | Woker .................... H04L 41/02 |
| | | 715/234 |
| 2015/0199185 A1 | 7/2015 | Saff et al. |
| 2015/0370688 A1 | 12/2015 | Zhang |
| 2015/0370694 A1* | 12/2015 | Zhang ................ G06F 11/3688 |
| | | 717/124 |
| 2016/0162392 A1 | 6/2016 | Hu et al. |
| 2017/0010951 A1 | 1/2017 | Vankataraman |
| 2017/0109698 A1 | 4/2017 | Panemangalore et al. |
| 2017/0126627 A1* | 5/2017 | Yang ..................... H04L 67/2842 |
| 2017/0132294 A1 | 5/2017 | Cooper |
| 2017/0153967 A1 | 6/2017 | Kalech et al. |
| 2017/0154056 A1 | 6/2017 | Qiu |
| 2017/0357624 A1* | 12/2017 | Punjabi ................. G06F 40/143 |
| 2018/0011780 A1 | 1/2018 | Aggarwel et al. |
| 2018/0025081 A1* | 1/2018 | Denninghoff ......... G06F 40/134 |
| | | 707/711 |
| 2018/0121332 A1 | 5/2018 | Andrejko et al. |
| 2020/0042578 A1* | 2/2020 | Wu ....................... G06F 40/154 |

OTHER PUBLICATIONS

ScrapeHero; Xpaths and their relevance in Web Scraping, URL: https://www.scrapehero.com/xpaths-and-their-relevance-in-web-scraping/.

\* cited by examiner

| Web element knowledge datastore | | | | | | | | | | |
|---|---|---|---|---|---|---|---|---|---|---|
| Element 62 | Name 64 | Class 66 | Id 68 | Linktext 70 | Absolute Xpath 72 | Relative Xpath 74 | CSS Selector 76 | Other Attributes 78 | Element Image 80 | Html 82 |
| | | | | | | | | | | |
| | | | | | | | | | | |

Fig. 4A

| Crawler Knowledge Datastore | | | | | | | | | | |
|---|---|---|---|---|---|---|---|---|---|---|
| Element 182 | Name 184 | Class 186 | Id 188 | Linktext 190 | Absolute Xpath 192 | Relative Xpath 194 | CSS Selector 196 | Other Attributes 198 | Element Image 200 | Html 202 |
| | | | | | | | | | | |
| | | | | | | | | | | |

Fig. 4B

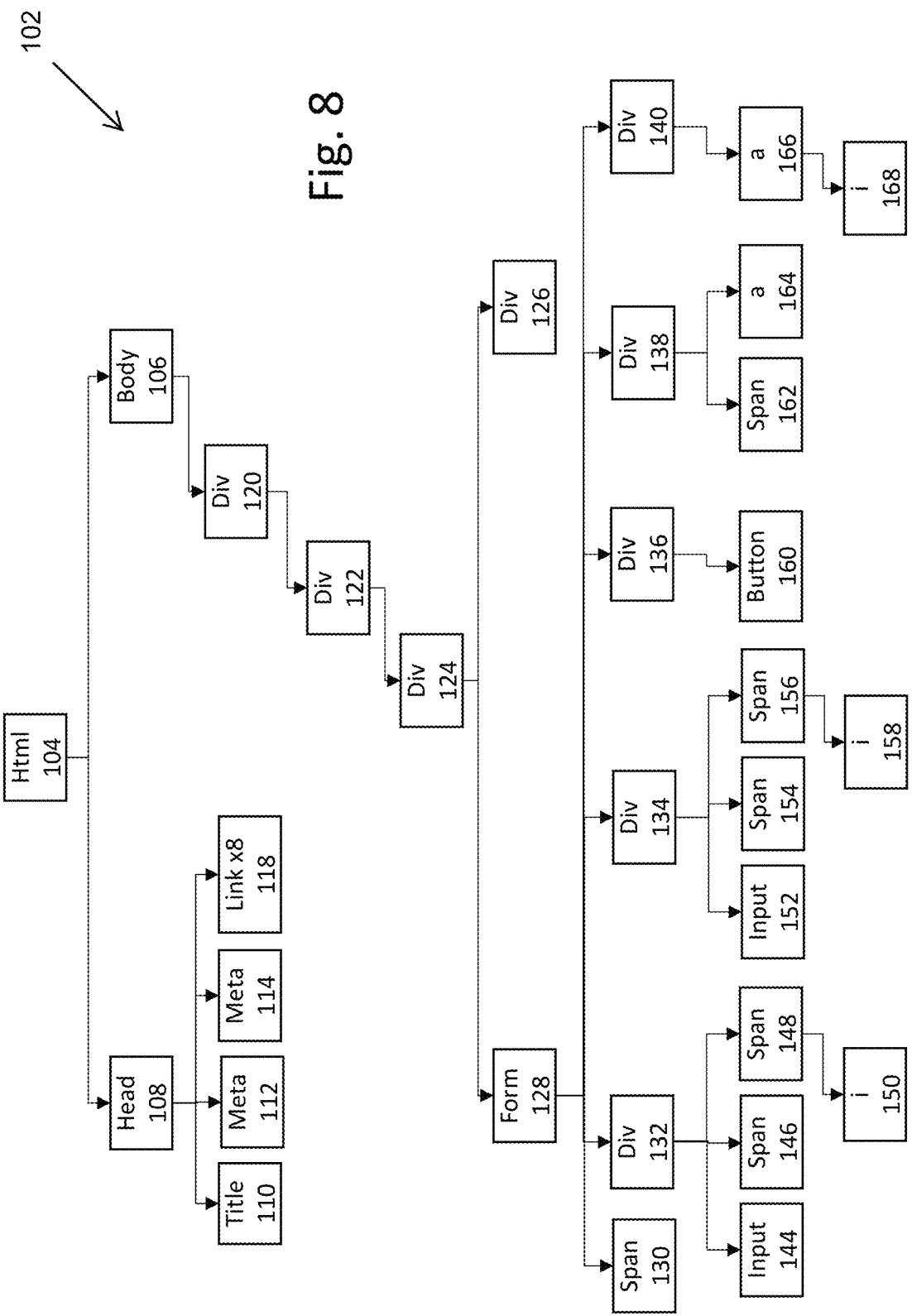

```
                                                                    101
    <!DOCTYPE html>
104  <html lang="en">
108   <head>                     111
110     <title>Login V1</title>
112     <meta charset="UTF-8">
114     <meta name="viewport" content="width=device-width, initial-scale=1">
        <!--================================================================-->
        <link rel="icon" type="image/png" href="images/icons/favicon.ico"/>
        <!--================================================================-->
118     <link rel="stylesheet" type="text/css" href=
          "vendor/bootstrap/css/bootstrap.min.css">
        <!--================================================================-->
        <link rel="stylesheet" type="text/css" href=
          "fonts/font-awesome-4.7.0/css/font-awesome.min.css">
        <!--================================================================-->
        <link rel="stylesheet" type="text/css" href=
          "vendor/animate/animate.css">
        <!--================================================================-->
        <link rel="stylesheet" type="text/css" href=
          "vendor/css-hamburgers/hamburgers.min.css">
        <!--================================================================-->
        <link rel="stylesheet" type="text/css" href=
          "vendor/select2/select2.min.css">
        <!--================================================================-->
        <link rel="stylesheet" type="text/css" href="css/util.css">
        <link rel="stylesheet" type="text/css" href="css/main.css">
        <!--================================================================-->
172   </head>
106   <body>          120
        <div class="limiter">
122       <div class="container-login100">
            <div class="wrap-login100">
124           <div class="login100-pic js-tilt" data-tilt>
126             <img src="images/img-01.png" alt="IMG">
              </div>
                         127
              128
```

Fig. 9

```
                    ╭─ 129                                              101
                    │                                               ╭──↙
        <form class="login100-form validate-form">
                <span class="login100-form-title">
   130 ─╮          Member Login
        │  </span>
   131 ─╯
         ╭── <div class="wrap-input100 validate-input"
   132 ─╯      data-validate = "Valid email is required:
                ex@abc.xyz">
                  <input class="input100" type="text" name="email"
           144 ─╮    placeholder="Email">                  ╭── 147
           146 ─╯  <span class="focus-input100"></span>
                ╭──<span class="symbol-input100">
           148 ─╯   <i class="fa fa-envelope" aria-hidden="true"
           150 ─╮   ></i>╲── 151
                │  </span>
   155 ─╮       ╰── 149
        ╰──</div>

134 ─╮ ╭── <div class="wrap-input100 validate-input"
        ╰─╯     data-validate = "Password is required">
           152 ─╮ <input class="input100" type="password" name=
                │   "pass" placeholder="Password">        ╭── 153          159
           154 ─╯ <span class="focus-input100"></span>                   ╭─╯
           156 ─╮ <span class="symbol-input100">                         │
                ╰─  <i class="fa fa-lock" aria-hidden="true"></i>
           158       </span>
                  </div>╲── 157
                  ╰── 135

136 ─╮ <div class="container-login100-form-btn">
        ╰─╮  <button class="login100-form-btn">
           160 ─╯    Login
                   </button>
   137 ─╯ </div>╲── 161

138 ─╮ <div class="text-center p-t-12">
        ╰─╮  <span class="txt1">
           162 ─╯    Forgot
           163 ─╯  </span>
                  <a class="txt2" href="#">
           164 ─╯    Username / Password?
                   </a>
   139 ─╯ </div>╲── 165

140 ─╮ <div class="text-center p-t-136">
        ╰─╮  <a class="txt2" href="#">
           166 ─╯    Create your Account
```

Fig. 10

```
                                                            ┌─ 101
                      168 ─┐
                         <i class="fa fa-long-arrow-right m-l-5"
                            aria-hidden="true"></i>
                   </a>                       └─ 165
                  </div> └─ 167
                </form>
 171 ─┐    </div>  └─ 169
        </div>   └─ 171
      </div>    173
       └─ 174

<!--===========================================================
=============-->
     <script src="vendor/jquery/jquery-3.2.1.min.js"></script>
<!--===========================================================
===========-->
     <script src="vendor/bootstrap/js/popper.js"></script>
     <script src="vendor/bootstrap/js/bootstrap.min.js"></script>
<!--===========================================================
===========-->
     <script src="vendor/select2/select2.min.js"></script>
<!--===========================================================
===========-->
     <script src="vendor/tilt/tilt.jquery.min.js"></script>
     <script >
         $('.js-tilt').tilt({
             scale: 1.1
         })
     </script>
<!--===========================================================
===========-->
     <script src="js/main.js"></script>
</body>  └─ 175
</html>
  └─ 170
```

| Index | Token | Type | Ref. No. |
|---|---|---|---|
| 0 | html | 1 | 104 |
| 1 | head | 1 | 108 |
| 2 | title | 1 | 110 |
| 3 | title | 2 | 111 |
| 4 | meta | 3 | 112 |
| 5 | meta | 3 | 114 |
| 6 | link | 3 | 118 |
| 7 | link | 3 | 118 |
| 8 | link | 3 | 118 |
| 9 | link | 3 | 118 |
| 10 | link | 3 | 118 |
| 11 | link | 3 | 118 |
| 12 | link | 3 | 118 |
| 13 | link | 3 | 118 |
| 14 | head | 2 | 172 |
| 15 | body | 1 | 106 |
| 16 | div | 1 | 120 |
| 17 | div | 1 | 122 |
| 18 | div | 1 | 124 |

| Index | Token | Type | Ref. No. |
|---|---|---|---|
| 19 | div | 1 | 126 |
| 20 | img | 3 | 127 |
| 21 | div | 2 | 128 |
| 22 | form | 1 | 129 |
| 23 | span | 1 | 130 |
| 24 | span | 2 | 131 |
| 25 | div | 1 | 132 |
| 26 | input | 3 | 144 |
| 27 | span | 1 | 144 |
| 28 | span | 1 | 146 |
| 29 | span | 2 | 147 |
| 30 | i | 1 | 150 |
| 31 | i | 2 | 151 |
| 32 | span | 2 | 149 |
| 33 | div | 2 | 155 |
| 34 | div | 1 | 134 |
| 35 | input | 3 | 152 |

260

| Index | Token | Type | Ref. No. |
|---|---|---|---|
| 36 | span | 1 | 154 |
| 37 | span | 2 | 153 |
| 38 | span | 1 | 156 |
| 39 | i | 1 | 158 |
| 40 | i | 2 | 159 |
| 41 | span | 2 | 157 |
| 42 | div | 2 | 135 |
| 43 | div | 1 | 136 |
| 44 | button | 1 | 160 |
| 45 | button | 2 | 161 |
| 46 | div | 2 | 137 |
| 47 | span | 1 | 162 |
| 48 | span | 2 | 163 |
| 49 | a | 1 | 164 |
| 50 | a | 2 | 165 |
| 51 | div | 1 | 140 |
| 52 | a | 1 | 166 |
| 53 | i | 1 | 168 |
| 54 | i | 2 | 165 |

| Index | Token | Type | Ref. No. |
|---|---|---|---|
| 55 | a | 2 | 167 |
| 56 | div | 2 | 169 |
| 57 | form | 2 | 171 |
| 58 | div | 2 | 173 |
| 59 | div | 2 | 176 |
| 60 | div | 2 | 174 |
| 61 | body | 2 | 175 |
| 62 | html | 2 | 170 |

| Index | Type |
|---|---|
| 0 | 16777216 |
| 1 | 16777216 |
| 2 | 16777216 |
| 3 | 33554432 |
| 4 | 50331648 |
| 5 | 50331648 |
| 6 | 50331648 |
| 7 | 50331648 |
| 8 | 50331648 |
| 9 | 50331648 |
| 10 | 50331648 |
| 11 | 50331648 |
| 12 | 50331648 |
| 13 | 50331648 |
| 14 | 33554432 |
| 15 | 16777216 |
| 16 | 16777216 |
| 17 | 16777216 |

| Index | Type |
|---|---|
| 18 | 16777216 |
| 19 | 16777216 |
| 20 | 50331648 |
| 21 | 33554432 |
| 22 | 16777216 |
| 23 | 16777216 |
| 24 | 33554432 |
| 25 | 16777216 |
| 26 | 50331648 |
| 27 | 16777216 |
| 28 | 16777216 |
| 29 | 33554432 |
| 30 | 16777216 |
| 31 | 33554432 |
| 32 | 33554432 |
| 33 | 33554432 |
| 34 | 16777216 |
| 35 | 50331648 |

| Index | Type |
|---|---|
| 36 | 16777216 |
| 37 | 33554432 |
| 38 | 16777216 |
| 39 | 16777216 |
| 40 | 33554432 |
| 41 | 33554432 |
| 42 | 33554432 |
| 43 | 16777216 |
| 44 | 16777216 |
| 45 | 33554432 |
| 46 | 33554432 |
| 47 | 16777216 |
| 48 | 33554432 |
| 49 | 16777216 |

| Index | Type |
|---|---|
| 50 | 33554432 |
| 51 | 16777216 |
| 52 | 16777216 |
| 53 | 16777216 |
| 54 | 33554432 |
| 55 | 33554432 |
| 56 | 33554432 |
| 57 | 33554432 |
| 58 | 33554432 |
| 59 | 33554432 |
| 60 | 33554432 |
| 61 | 33554432 |
| 62 | 33554432 |

Fig. 18B

| Index | 0 | 1 | 2 | 3 | 4 | 5 | 6 | 7 | 8 | 9 | 10 | 11 |
|---|---|---|---|---|---|---|---|---|---|---|---|---|
|  |  |  |  |  |  |  |  |  |  |  |  |  |
| Template | 1 | 1 | 1 | 2 | 2 | 1 | 1 | 2 | 2 | 2 |  |  |
|  |  |  |  |  |  |  |  |  |  |  |  |  |
| Ex 1 | 1 | 1 | 1 | 2 | 2 | 1 | 1 | 2 | 2 | 2 |  |  |
| Ex 2 | 1 | 2 | 1 | 2 | 2 | 1 | 1 | 2 | 2 | 1 |  |  |
| Ex 3 | 1 | 1 | 1 | 1 | 2 | 2 | 1 | 2 | 2 | 2 | 2 | 2 |
| Ex 4 | 1 | 1 | 1 | 1 | 2 | 1 | 1 | 2 | 2 | 1 | 2 |  |

Fig. 23

|   | S2 | 1 | 2 | 3 | 4 | 5 | 6 |
|---|----|---|---|---|---|---|---|
| S1 |   | 1 | 1 | 1 | 2 | 1 | 2 |
| 1 | 2 | 0 | 0 | 0 | 1 | 0 | 1 |
| 2 | 2 | 0 | 0 | 0 | 1 | 0 | 1 |
| 3 | 1 | 1 | 1 | 1 | 0 | 2 | 0 |
| 4 | 2 | 0 | 0 | 0 | 2 | 0 | 3 |
| 5 | 1 | 1 | 1 | 1 | 0 | 3 | 0 |
| 6 | 2 | 0 | 0 | 0 | 2 | 0 | 4 |

Fig. 28

WEB ELEMENT REDISCOVERY SYSTEM AND METHOD

FIELD OF THE INVENTION

This invention relates in general to systems and methods for web element rediscovery.

BACKGROUND OF THE INVENTION

In the field of user and web interface testing, a problem exists where a component or element of a webpage is changed without updating or notifying a preexisting testing process. Therefore, when the preexisting testing process is run on the updated webpage having the changed component or element, the test can fail because the testing process does not recognize and locate the changed component or element.

In other applications, such as automation or virtual assistants, preexisting functions or scripts may rely on the presence of elements of a webpage in order to carry out a desired function. For example, if an automation or portion of automation includes taking an action on a webpage, such as filling out a form, clicking a button, or otherwise interacting with the page, a change in that page may prevent the automation from completing the desired automated task.

The present inventors recognized the need for an improved system that attempts to identify the component or element that has been changed in a manner that allows the testing programs, processes, or scripts to continue testing or other use or action at a webpage to continue. The present inventor recognized the need for a system to identify a changed element as associated with an originally sought element.

SUMMARY OF THE INVENTION

A system and method of identifying a changed element within a target web page is disclosed. A pre-region longest matching segment of the pre-region that matches a pre-region segment of a pre-region of a source web page is identified within a pre-region of the target web page. A post-region longest matching segment of the post-region that matches a post-region segment of the post-region of a source web page is identified within a post-region of the target web page. The changed element in the target web page is identified that is between the pre-region longest matching segment and the post-region longest matching segment in response to the pre-region longest matching segment being determined to be within a pre-defined distance of the post-region longest matching segment.

In some embodiments, method and system includes the step of proceeding, starting with the pre-region longest matching segment not being within a pre-defined distance of the post-region longest matching segment, to reduce a size of the pre-region of the source web page and of the pre-region of the target web page by excluding the pre-region longest matching segment from the pre-regions and/or to reduce a size of the post-region of the source web page and a size of the post-region of the target web page by excluding the post-region longest matching segment from the post-regions, with the reduced pre-regions and the reduced post-regions acting as initial values for a next iteration, until the pre-region longest matching segment is within the pre-defined distance of the post-region longest matching segment.

In some embodiments, the system or method includes the step of identifying a repeated sequence range within the source web page containing repeated sequences of tags, reducing a size of each of the pre-regions and/or a size of each of the post-regions within the repeated sequence range. In some embodiments, the method includes the steps of identifying an instance range of an instance of a repeated sequence within the repeated sequence range, and reducing a size of each of the pre-regions and/or a size of each of the post-regions within the instance range.

Another embodiment of a system and method of identifying an element within a target web page that has been changed is disclosed. One or more locators known to be associated with the sought element is compared to locators of elements of the target web page.

If the web element of the target web page is not associated with a locator that uniquely identifies the sought element within the target web page and matches a locator of the one or more locators known to be associated with the sought element, then a pre-region longest matching segment of the pre-region that matches a pre-region segment of a pre-region of a source web page is identified within a pre-region of the target web page. A post-region longest matching segment of the post-region that matches a post-region segment of the post-region of a source web page is identified within a post-region of the target web page. The pre-region longest matching segment is determined to be within a pre-defined distance of the post-region longest matching segment. The changed web element in the target web page is identified that is between the pre-region longest matching segment and the post-region longest matching segment in response to the pre-region longest matching segment being determined to be within a pre-defined distance of the post-region longest matching segment.

Numerous other advantages and features of the present invention will become readily apparent from the following detailed description of the invention and the embodiments thereof, from the claims, and from the accompanying drawings.

BRIEF DESCRIPTION OF THE DRAWINGS

FIG. 4A is a block diagram of a web element knowledge datastore of the web element rediscovery system.

FIG. 4B is a block diagram of a crawler knowledge datastore of the web element rediscovery system.

FIG. 8 is a graphical representation of an HTML parse tree or DOM tree for the webpage of FIG. 5.

FIG. 9 is a first portion of an html code corresponding to the webpage of FIG. 5.

FIG. 10 is a second portion of the html code corresponding to the webpage of FIG. 5.

FIG. 11 is a last portion of the html code corresponding to the webpage of FIG. 5.

FIG. 17 is a second table portion showing exemplary tokenization and encoding of the html code of FIGS. 9 to 11.

FIG. 18A is a first table portion showing an alternative exemplary tokenization and encoding of the html code of FIGS. 9 to 11.

FIG. 18B is a second table portion showing of the alternative exemplary tokenization and encoding of the html code of FIGS. 9 to 11.

FIG. 23 is a table of type sequences corresponding to an exemplary template page and exemplary extraction pages.

FIG. 28 is an exemplary dynamic programming table.

DETAILED DESCRIPTION

Figure 1:
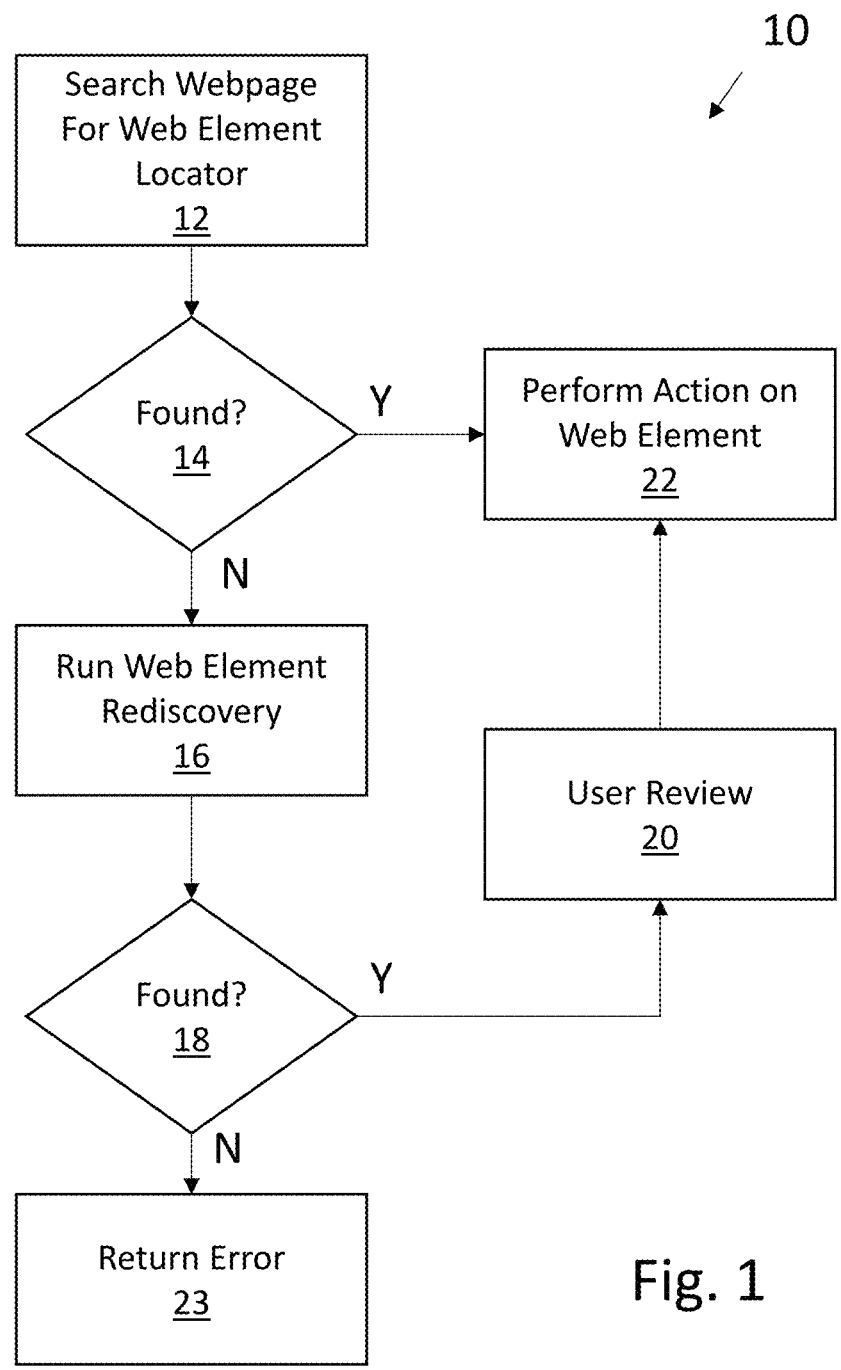
FIG. 1 is an example web element searching function usable with the web element rediscovery system of the invention.

The following description is presented to enable any person skilled in the art to make and use the invention. For the purposes of explanation, specific nomenclature is set forth to provide a plural understanding of the present invention. While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

A web element rediscovery system and method is disclosed. FIG. 1 shows an example web element searching function 10 which searches for a web element locator. This searching function 10 may be used as or in a testing function or program, such as a user interface testing function. The user interface testing may be for a testing a webpage or a function or application comprising or deployed within or associated with a webpage, such as webpage 50. In some applications, the webpage may be used, accessed, or displayed in a web browser application. In some applications, the webpage may be used, accessed, or displayed in within another application that has web browser capability, such application may be known as a hybrid apps or applications.

At step 12, the function 10 searches a pre-identified webpage for a pre-identified web element locator. The webpage can be any webpage, either locally accessible on a computer or remotely accessible across a network, such as network 352. The web element locator can be any attribute of or associated with the web element. In some embodiments, the web element locator is the name, class name, id, linktext, partial linktext, tag name, DOM locator, coordinates, Xpath, or CSS selector, and/or other attribute of or associated with the web page element.

In some embodiments, in Hypertext Markup Language (HTML), the name attribute identifies the name of the web element, the class attribute identifies the class associated with the web element and is often used with CSS (Cascading Style Sheets) to style elements with common properties, the ID attribute identifies a unique id for the HTML element, link text is the text displayed for a URL (Uniform Resource Locator) of a linked resource; xpath is a query language for selecting nodes from an XML document; and, a CSS selector is a pattern used to select the element(s) to be styled. HTML is a computer code or markup language for web pages, which may be displayed in a web browser.

In some embodiments, a web page element is a component of a webpage. For example, a web page element could be fields of a webpage, such as an email field 52, a password field 54, or other types of fields, or an actionable element, such as a button 65. Further web page elements may include, but is not limited to, an edit box, link, button, image, image link, image button, text area, checkbox, radio button, or dropdown list.

If the function 10 finds the web element locator at step 12, then at step 14 it will proceed to perform an action on the web element at step 22. The action or activity at step 22 can be an action or activity associated with a test of the webpage or an underlying application associated with the webpage. The action can be any browser action that mimics human interaction with the web element identified by using the web element locator, for example, an action could be a click, selection, fill in text and click or select, etc. If the function 10 does not find the web element locator at step 12 then at step 14 it will proceed to step 16 to run the web element rediscovery system 24 in an attempt to determine a location of the changed web element that cannot be located.

If the web element rediscovery system 24 returns an identified web element matching or corresponding to the original sought missing web element, then at step 18, the function 10 may, optionally, send the identified element to a queue for a user to review at step 20. If the user approves the identified element or if no user approval is needed, then the function 10 will proceed to step 22 to perform the action step on the identified web element. If the web element rediscovery system 24 cannot identify, within a pre-defined threshold or certainty, an identified element, then it will return an error at step 23. This might occur if the webpage is changed too extensively for the original web element to be located.

In some applications, the action at step 22 can be an action performed in or with a user interface test(s) involving the webpage. In some applications, the action at step 22, can be to perform an action on the webpage, including an action resulting from pre-defined automation step, such as might be used in process automation, including robotic process automation or other automation. Further, the action at step 22, can be to perform an action on the webpage in connection with a voice command given by a user. For example, a user may issue a voice command to a voice recognition/assistant function, such as the SIRI assistant by Apple, Inc. The voice command by request that the assistant function book a rental car on a given date for a given location. The assistant function may be configured to look for a pre-defined locator in a given rental car booking webpage. If the locator is not found, the system can proceed to the step 16 to run the web element rediscovery system 24 in an attempt to determine a location of the changed web element that cannot be located. If the web element is found, then action or actions on the rental car booking webpage, for example, can start, resume, or continue at step 22.

Figure 2A:
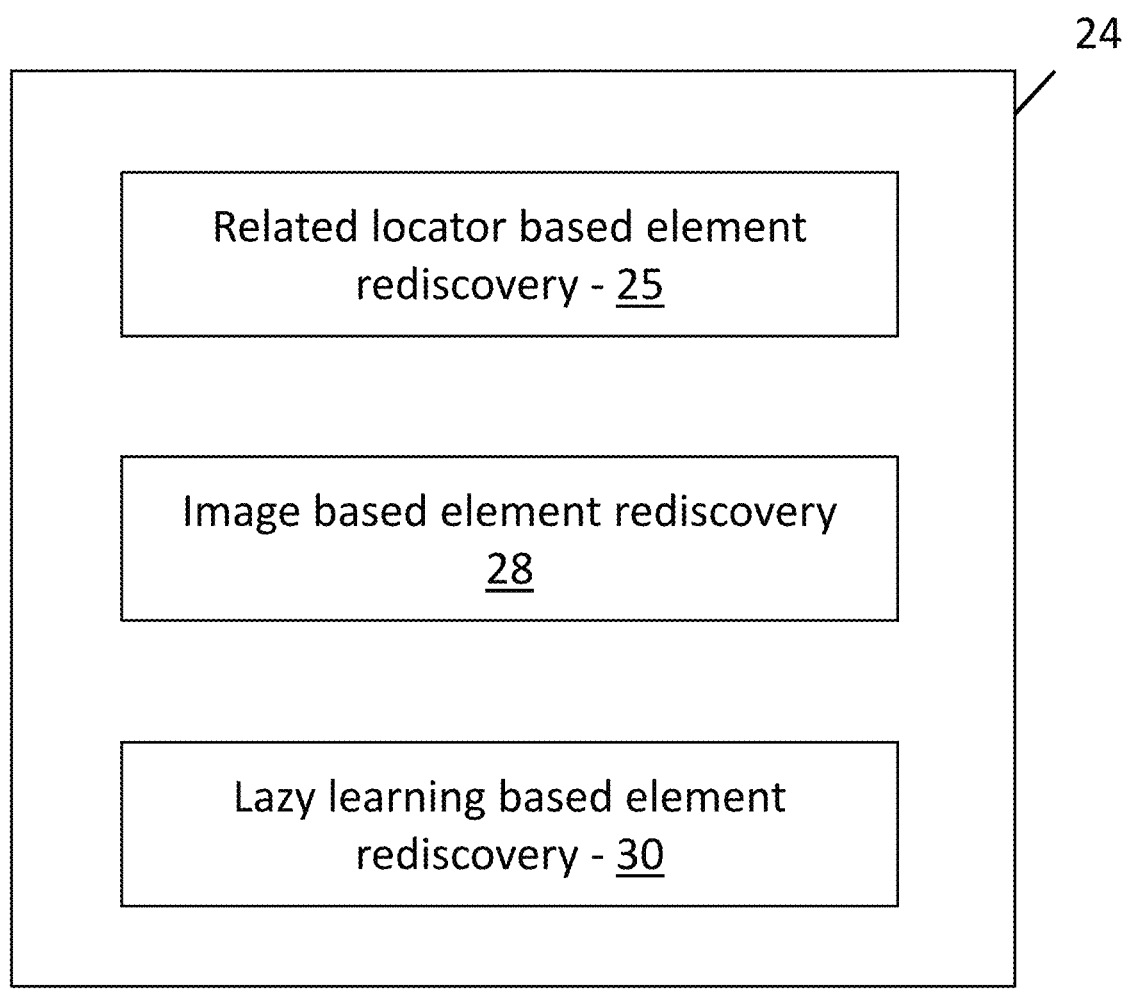
FIG. 2A is a block diagram of certain functions of the web element rediscovery system of the invention.

In some embodiments, the web element rediscovery system 24 may comprise one or more functions for identifying the sought web element, including the location of the sought web element within the target web page under consideration or testing. FIG. 2A shows three functions, a related locator based element rediscovery function 25, an image based element rediscovery function 28, and a lazy learning based element rediscovery function 30. In some embodiments, the web element rediscovery system comprises only one of these functions. In some embodiments, the web element rediscovery system comprises two of these functions. In some embodiments, the web element rediscovery system comprises all three of these functions.

Figure 2B:
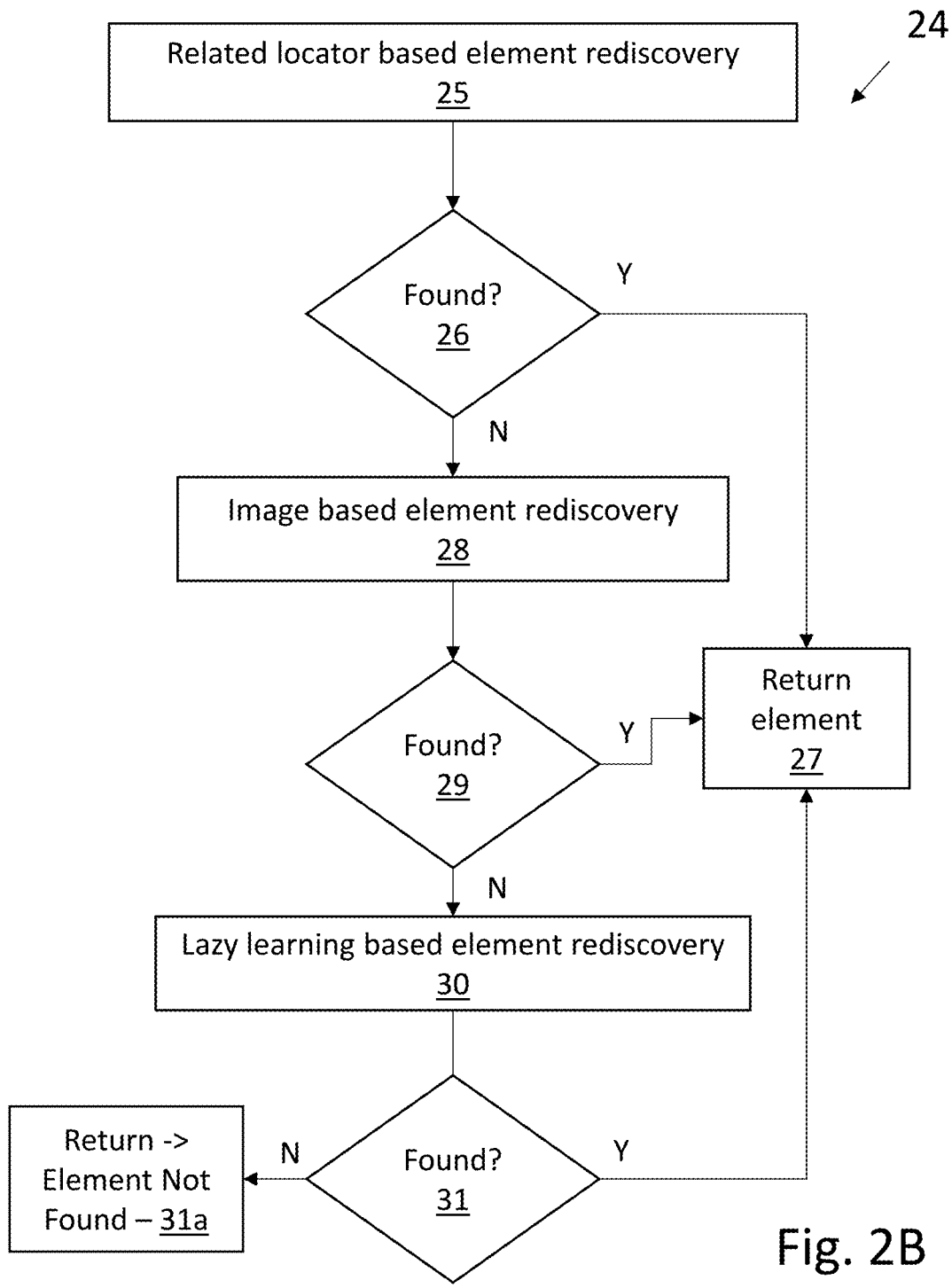
FIG. 2B is a flow diagram of certain functions of the web element rediscovery system.

FIG. 2B shows that in some embodiments, the web element rediscovery system 24 involves calling and using related locator based element rediscovery function 25 first, then image based element rediscovery function 28, and then lazy learning based element rediscovery function 30, but other orders are possible. Further, in some embodiments, the image based element rediscovery function 28 is a sub-function within the related locator based element rediscovery function 25.

If related locator based element rediscovery function 25 identifies the sought web element then the identified sought element is returned at step 27 after step 26, and the web element rediscovery system 24 need not go to or use functions 28 and 30. Similarly, if function 28 identifies the sought web element then at step 27 the identified sought web element is returned, after step 29, and the web element rediscovery system 24 need not go to or use functions 30. If the probable identified sought web element is not found with functions 25, 28, or 30, then at step 31 the web element rediscovery system 24 returns indicates the sought web element was not found, such as by returning a value indicating that the element sought was not found at step 31a.

Figure 3A:
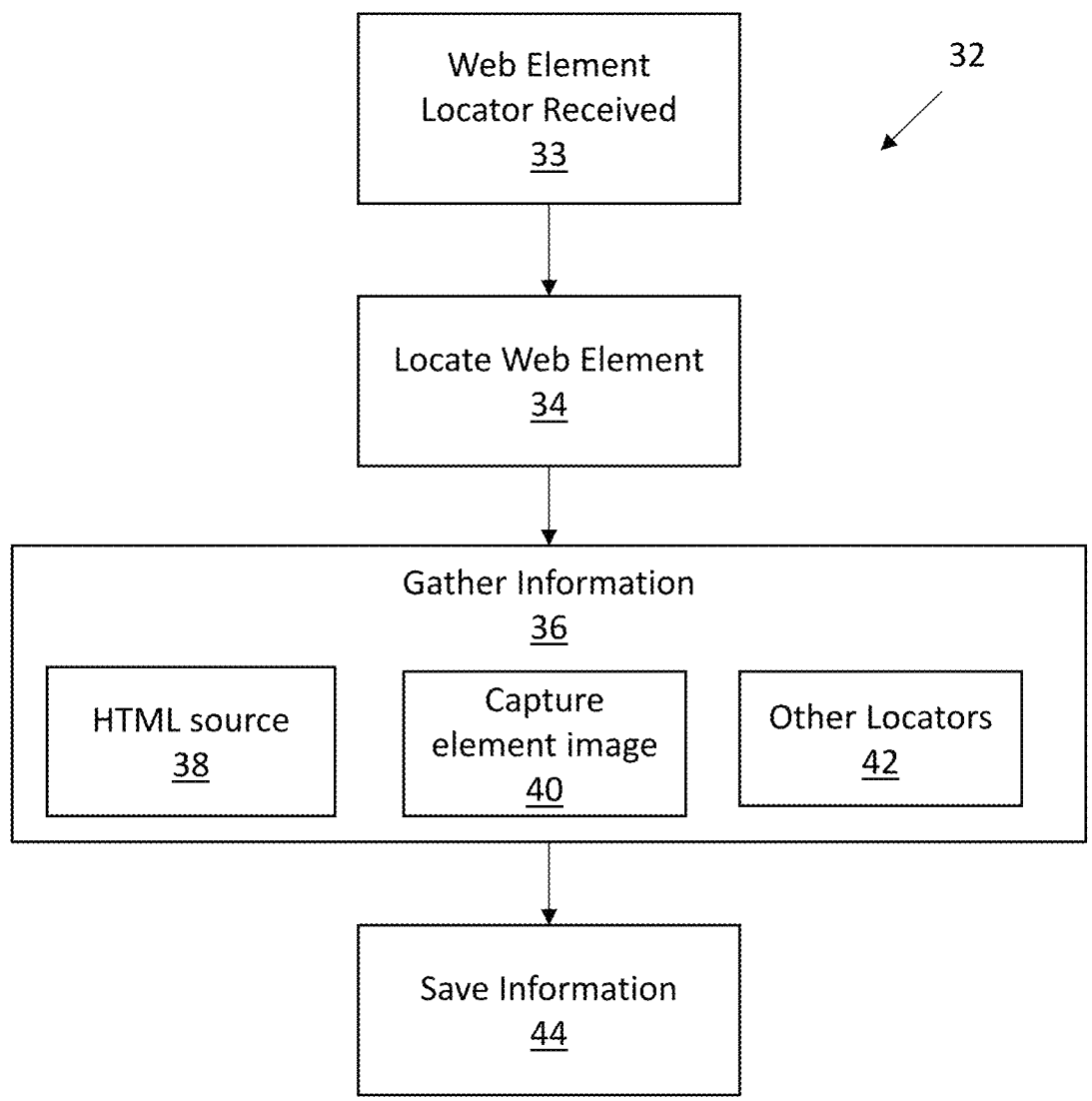
FIG. 3A is a flow diagram of a capture function of the web element rediscovery system.

The web element rediscovery system 24 comprises a capture function 32, shown in FIG. 3A. Before an error occurs, such as an error at step 14, where a web element locator is not found, the capture function 32 retrieves certain information regarding the webpage, such as webpage 50, under consideration. The capture function can began at or after a web element locator is defined for a web element, such as a web element used in testing a user interface. The capture function occurs before an error occurs resulting from a changed or missing web element. In some embodiments, at least one successful test of the webpage under consideration must occur before calling or implementing the web element rediscovery system 24. The successful test may include performing of an action on the web element at step 22 and obtaining a pre-defined satisfactory result from the performed action. Therefore, the web element rediscovery system 24 can capture accurate information about the webpage before an error occurs.

At step 33, the capture function 32 determines whether it has received a web element locator, such as from a user, for a web element involved or to be involved in a test. If the capture function 32 has not received a web element locator or the web element locator is not available to the function 32, the capture function will not begin and may wait until a web element locator is received. If a web element locator has been defined and is available to the capture function, it will proceed to step 34 to attempt to find the web element corresponding to the web element locator. At step 36, the capture function will gather information from the webpage having the web element, including the webpage source code, such as HTML source code 38, the element image 40, if any, corresponding to the web element, and other locators 42 associated with the web element. Then at step 44 the function 32 will save the webpage source code, the element image, and the other locators to a web element knowledge datastore 46 of the web element rediscovery system 24, such as a computer database. In some embodiments, the data in the datastore can be represented in a table format or other suitable format, such as table 48.

Figure 5:
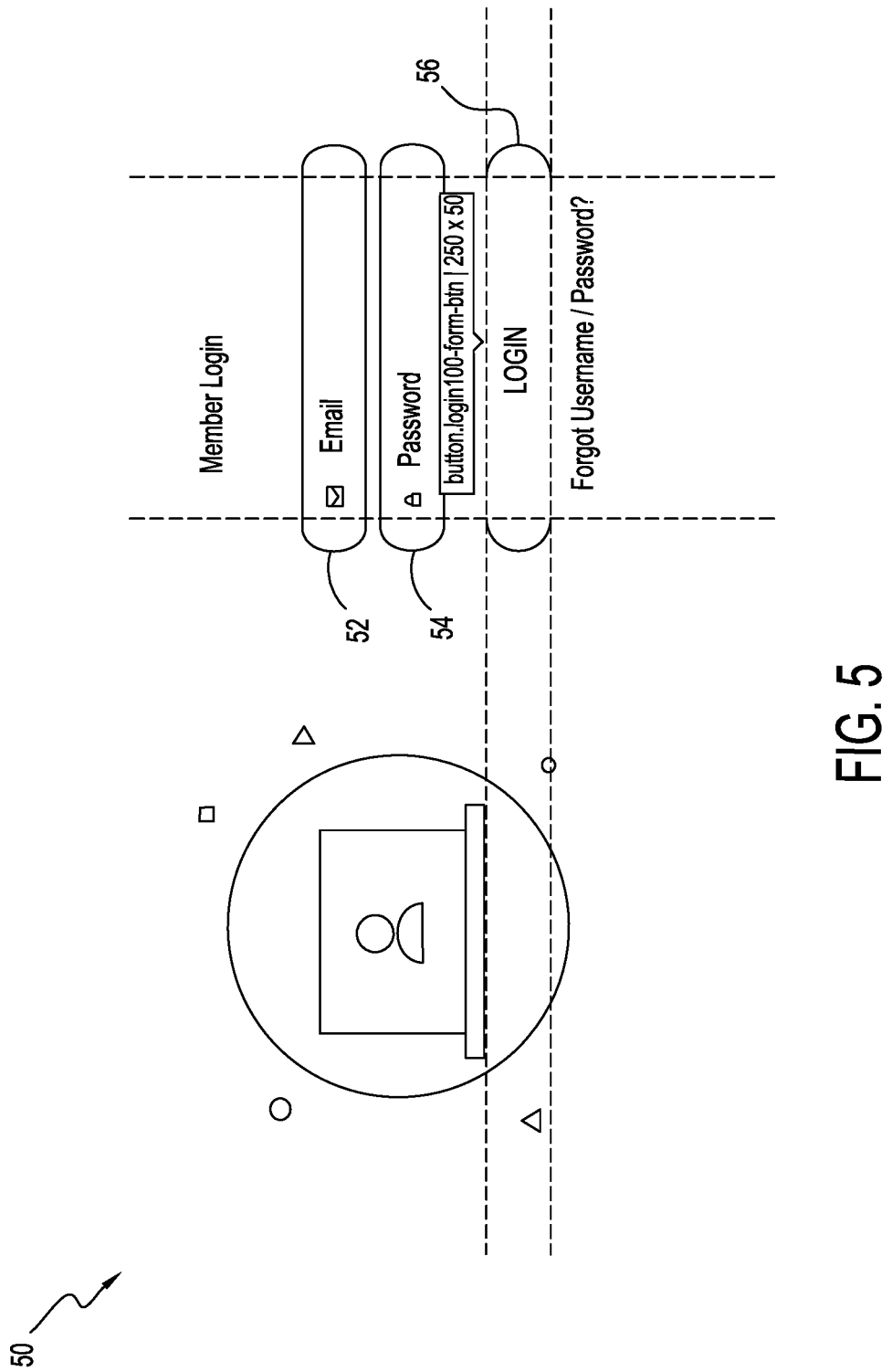
FIG. 5 is an exemplary webpage 50, with certain markup shown in connection with the login button.

FIG. 5 shows an exemplary webpage 50 for illustration purposes, with certain markup shown in connection with the login button 56. The webpage 50 comprises a login interface. The webpage 50 comprises an email address field 52, a password field 54, and a login button or selector 56, among other web elements. Therefore, example an test process may test various login attempts on the webpage to determine whether the webpage and/or underlying function or application responds as expected under various scenarios. To test logins, a testing script, function, or program will need to identify the email address field, so that it may enter data in that field, the password field, so that it may enter data in that field, and the login button, so that it may select it to cause the email address and password to be submitted and to determine whether the program responds as expected to a given input.

Therefore, if the web element for a given part of a testing process is the login button 56, the web element locator could be the class name. The class name 60 for the login button is shown in the code excerpt portion 58 of FIG. 6 below the webpage 50. The class name 60 is "login100-form-btn" in the example of FIG. 6. This may be an acceptable web element locator if no other item on the webpage has a class name of "login100-form-btn", therefore when this class name is found, it will correspond to the desired button 56 uniquely.

Once the web element locator is specified, which can locate the web element uniquely in the webpage and before an error occurs resulting from a changed or missing web element or web element locator, the web element rediscovery system 24 processes the corresponding webpage at step 36 to find other attributes that correspond to the web element and might be used as related web element locators. For example, if a class attribute of the web element is given as the web element locator then other attributes such as id, name, linktext are found if present, by the capture function, and locators such as xpath and css selectors are generated by the system 24 or capture function for the web element. This captured information is saved in the web element knowledge datastore 46, in the corresponding fields or sections, as shown in FIG. 4A.

Figure 6:
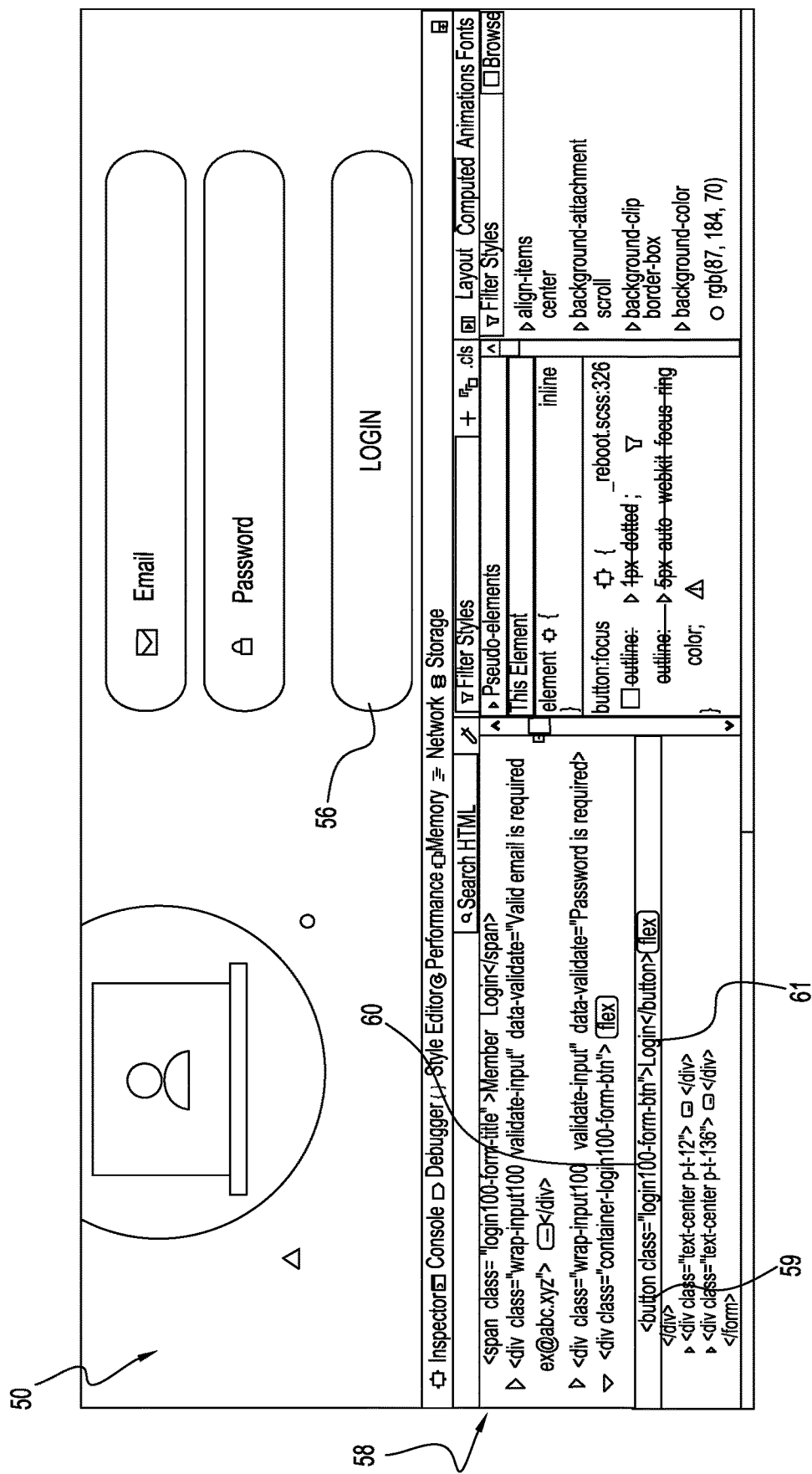
FIG. 6 is the webpage of FIG. 5 with code excerpt overlaid and shown below the webpage.

FIGS. 9 through 11 show exemplary HTML source code 101 for the webpage 50 of FIGS. 5 and 6. In the example of the source code 101 for webpage 50, at step 36, the capture function 32 will record the corresponding information in the corresponding field into a record of the datastore 46 or the table 48. In the element field 62, the function will record the value "button", at 13, from the button 59 (FIG. 5), 160 (FIG. 10) in the HTML page source code shown in FIGS. 5 and 10. There is no value for the name field 64 or the Id field 68 or the other attributes field 78 so those values will be blank, null, " ", " ", or a similar indication of no value. The function 32 will save the value "login100-form-btn" shown at 60 in FIG. 6, to the class field 66. The function 32 will save "Login", shown at 61, to the link text field 70. The function 32 will save "/html[1]/body[1]/div[1]/div[1]/div[1]/form[1]/div[3]/button[1]" to the absolute Xpath field 72. The function 32 will save "//button[@class='login100-form-btn']" to the relative Xpath field 74. The system will save "div.limiter:nth-child(1) div.container-login100 div.wrap-login100 form.login100-form.validate-form div.container-login100-form-btn:nth-child(4)>button.login100-form-btn" to the CSS selector field 76. The system will save the image of the login button 56 as shown in FIG. 6 to the element image field 80. The system will save a copy of the entire HTML page source code 101 for the webpage 50 in the html field 82. The Absolute Xpath and Relative Xpath are generated by the system 24 based on the HTML page source code 101. The value of "/html[1]/body[1]/div[1]/div[1]/div[1]/form[1]/div[3]/button[1]" is derived from the HTML page source code 101 for the login button 56, 59, 160 in the following manner. Beginning at the top of the HTML page source code 101 there are the following open html tags before reaching the login button: 1 html tag 104, e.g. <html lang='em'>, 1 body tag 106, e.g. <body>, 1 div tag 120, e.g. <div class="limiter">, 1 div tag 122, e.g. <div class="container-login100">, 1 div tag 124, e.g. <div class="wrap-login100">, 1 form tag 129, e.g. <form class="login100-form validate-form">, 3 div tags 132, 134, 136, e.g. <div class="wrap-input100 validate-input" data-validate="Valid email is required: ex@abc,xyz"<, div class="wrap-input100 validate-input" data-validate="Password is required">, and <div class="container-login100-form-btn">, and 1 button tag 160, e.g. <button class="login100-form-btn">. Therefore, the system 24 uses the open tags in the same branch of a DOM tree 102 corresponding to the webpageahead of the login button in the source code to generate the absolute Xpath value.

The relative Xpath value is generated by starting with button node 160 and referencing the desired element from there. In this case //button, of "//button[@class='login100-form-btn']" references the button at 59, 160. And the @class='login100-form-btn' references the class attribute at 60 relative to the button element at 59.

Figure 3B:
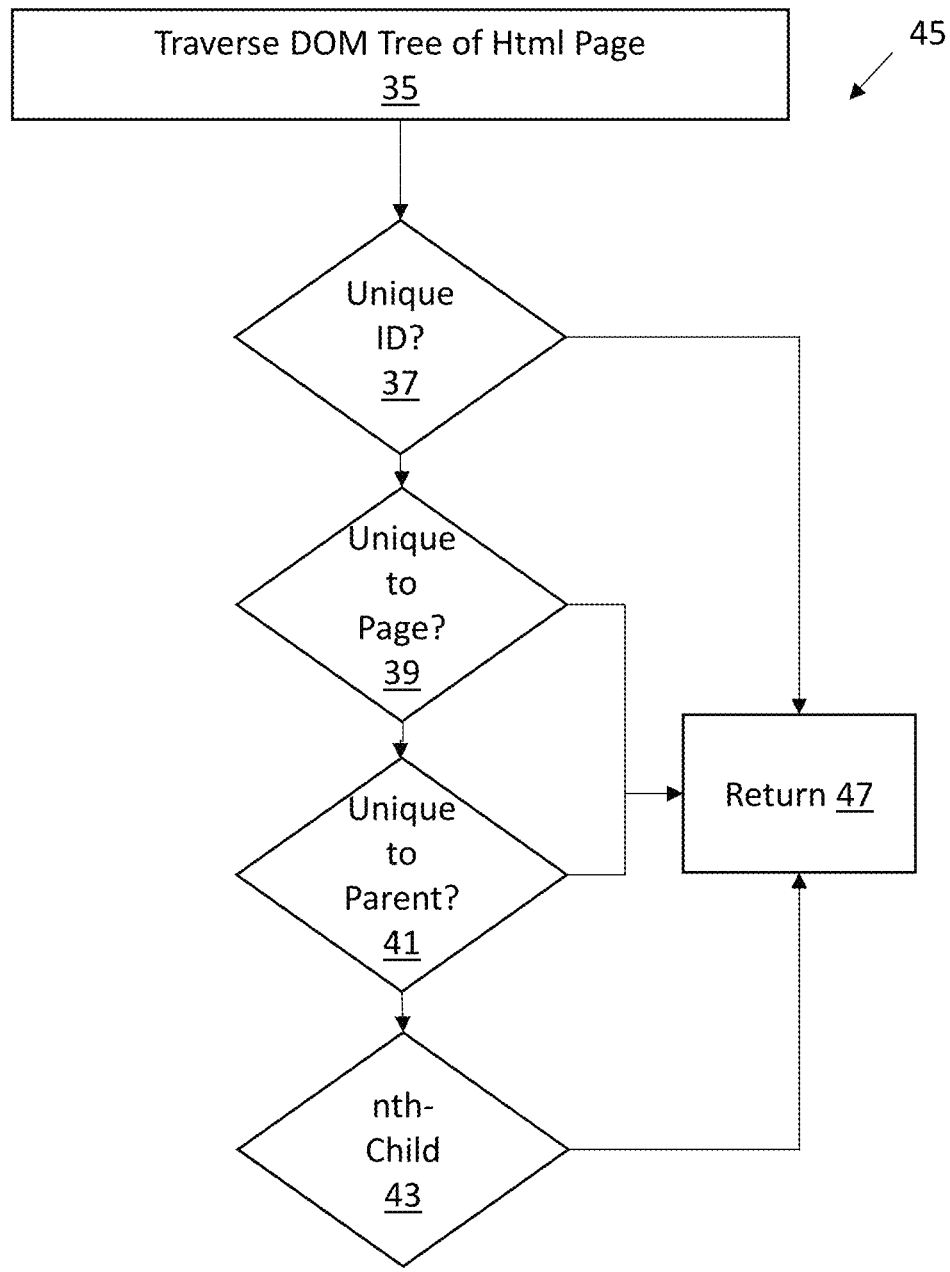
FIG. 3B is a flow diagram of a CSS selector generating function of the web element rediscovery system.

In some embodiments, the web element rediscovery system comprises a CSS selector generating function 45, shown in FIG. 3B, configured to generate a CSS selector string capable of identifying the target element uniquely in the html page source code 101. The CSS selector generating function 45 traverses 35 a DOM tree corresponding to the html code, such as Dom tree 102 explained below. For each node or element within the DOM tree 102 the CSS selector generating function considers whether the target element has an ID that uniquely identifies the target element in the page source code 101. If so, it uses that ID as the CSS selector and returns at step 47. If not, then the function 45 considers, at 39, whether the target element has a class or tag value that uniquely identifies the target element in the page source code 101. If so, the function 45 uses that class or tag value as the CSS selector and returns at step 47. If not, then the function 45, considers, at 39 whether the target element has a class or tag value that uniquely identifies the current node/element' under its parent element, that is among the sibling nodes under the parent. For example, nodes 130, 132, 134, 136, 138, and 140 are all children of parent node 128 and siblings of each other. If there is a the target element has a class or tag value that uniquely identifies the current node/element under its parent element, then that tag or call value will be used to identify the target under its parent node, and another selector will be used to identify the parent node within the page source code 101, in the same manner as describe above. Else, an nth-child node selector can be used to select the $n^{th}$ child node of a given parent, where n is the number, such as a non-negative non-zero integer, that represents the position of the child relative to other sibling nodes under the parent node. For example, node 130 is the first node and would be the $1^{st}$-child under parent node 128. Node 132 is the second node under parent node 128 and would be the $2^{nd}$-child under parent node 128. The function 45 continues to build up a selector string via 37, 39, 41, and 43, until the css selector string is able to uniquely return the target element. This css selector string is returned at step 47 and stored in the css selector field 76 corresponding to the target element.

In the case of css selector string is "div.limiter:nth-child(1) div.container-login100 div.wrap-login100 form.login100-form.validate-form div.container-login100-form-btn:nth-child(4)>button.login100-form-btn." The section: "div.limiter:nth-child(1)" identifies the first node under body 106 with class value of "limiter". The section "div.container-login100 div.wrap-login100 form.login100-form.validate-form" identifies following div tag 120, div tag 122, and form tag 128. After form tag 128, "div.container-login100-form-btn:nth-child(4)" provides to navigate to the $4^{th}$ child node under form tag 128 and to identify the element with class "button.login100-form-btn", which is the button tag 160. Therefore following the forgoing css selector string will uniquely identify the button element 160.

The system will save other attributes to the other attributes field 78 when other attributes are present. In the case of the button 59 of FIGS. 5 and 6, no other attributes exits. Other attributes could include any attribute other than the attribute types specified in fields 62, 64, 66, 68, 70. In some embodiments, the other attributes could instead or in addition comprise other non-attribute locators.

Figure 7:
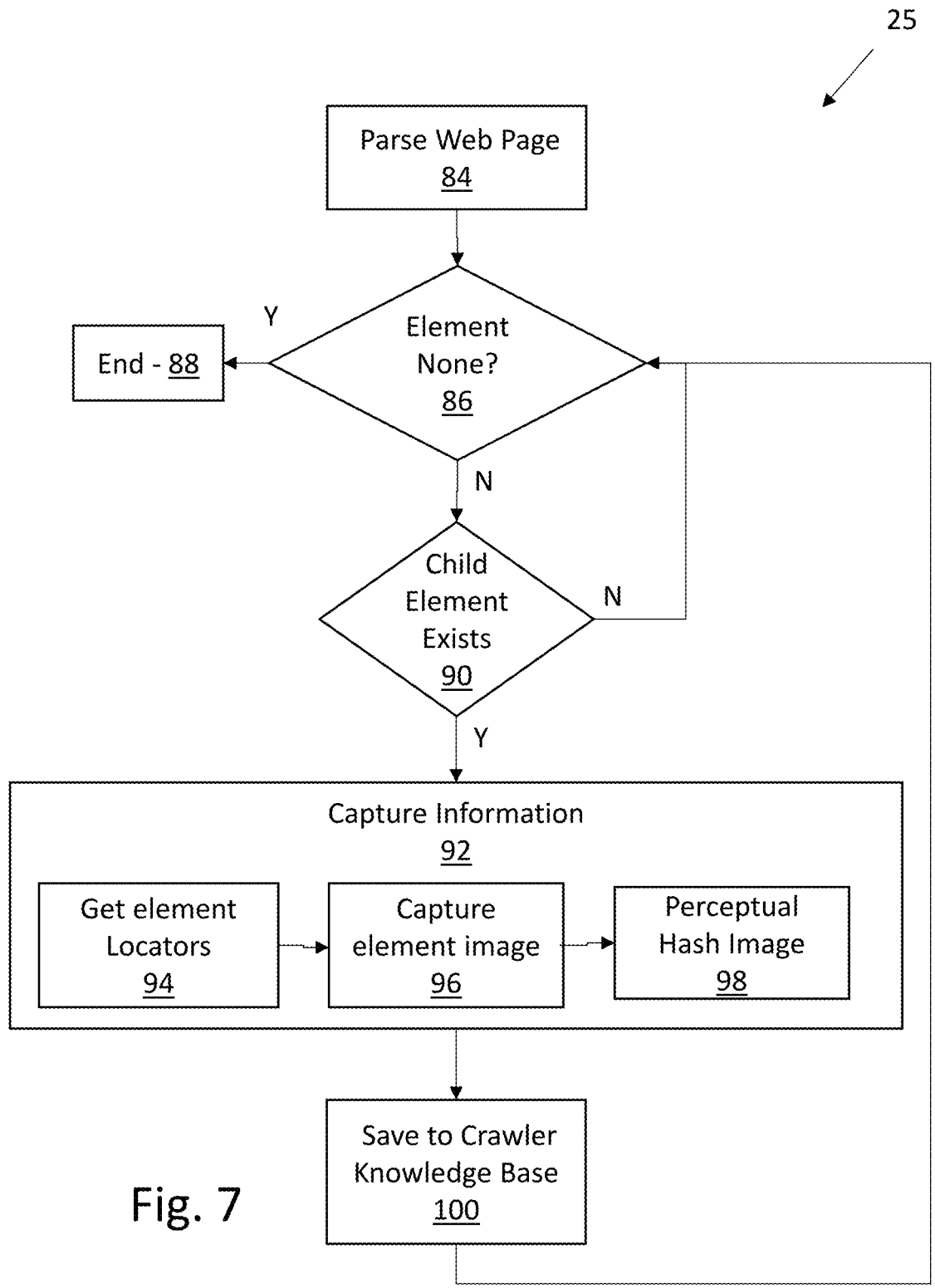
FIG. 7 is a flow diagram of a related locator based element rediscovery function of the web element rediscovery system.

FIG. 7 shows one embodiment of the related locator based element rediscovery function 25. At step 84, the function parses the webpage under test. The function 25 then generates an HTML parse tree based on that webpage.

FIG. 8 shows a graphical representation of an HTML parse tree 102 for the webpage shown in FIGS. 5 and 6. The graphical representation of an HTML parse tree 102 can also be considered a DOM (Document Object Model) tree for code of FIGS. 9-11 and the webpage shown in FIGS. 5 and 6. However the parse tree 102 may be saved in a different format than is shown in FIG. 8.

The parse tree 102 corresponds to the source code shown in FIGS. 9 through 11. The tree is arranged based on the structure of the opening and closing of HTML tags within the code 101. The HTML tags 104, 106, 108, 110, 112, 114, 118, 120, 122, 124, 126, 128, 130, 132, 134, 136, 138, 140, 144, 146, 148, 150, 152, 154, 156, 158, 160, 162, 164, 166, and 168 of FIGS. 9 through 11 are shown in HTML parse tree 102 format in FIG. 8. Where more than one html tags open and close directly under and within an open html tag, they are shown on the same level in the HTML parse tree 102. For example, the head tag 108 and the body tag 106 open and close under the html tag 104, which is before the html tag 104 closes. The closing html tag 170 begins within a slash, "/". Therefore generally an open tag is closed by the same characters preceded by a slash character, "/". Similarly, the title tag 110, the meta tag 112, and the meta tag 114 and 8 link tags 118 open and close under the head tag 108 before the close head tag 172 is reached in the code 101. Therefore, the title tag 110, the meta tag 112, and the meta tag 114 and 8 link tags 118 are on the same level within the parse tree 102.

As a further example, div tag 120 opens, but before it closes, another div tag 122 opens, and before div tag 122 closes, another div tag opens 124. Therefore, div tags 120, 122, 124 are nested and they represented as progressively lower levels within the tree 102. Div tags 120, 122, 124 are not on the same level in the tree 102 because 122 is not directly under body 106, that is, div tag 120 does not close (with close div tag 174) before div tag 122 is reached. Therefore, to get to the body tag 106, in the code, the system must go through the open div tag 120 up the tree 102. Similarly div tag 124 is not directly under body tag 106 or div tag 120, that is, div tag 120 is not closed (with close div tag 174), and div tag 122 is not closed (with close div tag 176) before div tag 122 is reached in the code.

Then the function 25 traverses the HTML parse tree of the webpage under consideration, e.g. the webpage where the web element locator is not found at step 14. In some embodiments the function 25 uses a recursive traversing function to traverse the HTML parse tree and save the information about each element of the tree, and therefore the corresponding web page code. The system will recursively process the node of the HTML parse tree. During each recursive call of the recursive traversing function at step 86 the system will determine whether there are any more nodes left in a given branch of the parse tree, if not, that particular instances of the traversing function call will end at step 88. However, if there are elements left in that branch of the parse tree, then while there are child elements at step 90, the system will capture information at step 92 about the element of the parse tree being processed. The information gathered includes the element locators at step 94. The element locators for the target web page were the error occurred at step 14 are, in some embodiments, of the types described regarding field 62, 64, 66, 68, 70, 72, 73, 76, and 78.

Therefore, the system will gather from the target web page where the error occurred the same type of information that the system gathered from the original error-free webpage at step 36. This information is shown in FIG. 4B where a table view 180 of one embodiment of the crawler knowledge datastore 100 is shown. The crawler knowledge datastore 100 comprises an element field 182, a name field 184, a class field 186, a Id field 188, link text field 190, absolute Xpath field 192, relative Xpath field 194, CSS Selector field 196, an other attributes field 198, an element image field 200, and a HTML section 202, for receiving the corresponding information about the target web page where the error occurred.

The following provides an example application of the related locator based element rediscovery function 25, in the case of a change to the source code 101 of FIGS. 9-11. If "login100-form-btn" was the original element locator 13, then assume that the changed webpage source code changed the class value to "login101-form-btn". Therefore, an excerpt of the changed code is:

```
<div class="container-login100-form-btn">
    <button class="login101-form-bin">
```

-continued

```
        Login
    </button>
</div>
```

Then at step 12 and 14 the web element locator "login100-form-btn" would not be found in the changed target web page source code. The system would proceed to run the web element rediscovery system 24 and start the related locator based element rediscovery function 25. The system will save the changed target web page to the crawler knowledge datastore 100 as described above.

The related locator based element rediscovery function 25 attempts to identify the sought web element that corresponds to the missing web element locator. The missing web element locator is "login100-form-btn" in this example, which corresponds to the login button at 59, 160. The function 25 will fir look other locators previously associated with the missing web element locator. In this case, those other locators are the locators saved in fields 62, 64, 66, 68, 70, 72, 74, 76, and 78. Therefore, if for example, the absolute Xpath of /html[1]/body[1]/div[1]/div[1]/div[1]/form[1]/div[3]/button[1] uniquely identifies the sought web element within the source code of the changed target web page, then the system will use /html[1]/body[1]/div[1]/div[1]/div[1]/form[1]/div[3]/button[1] as the new web element locator and will return that locator at steps 26 and 27 and 18. In some embodiments, rather than or in addition to returning the new web element locator, the function may also return the location in the target web page containing the sought web element.

In some embodiments, if for example, the absolute Xpath of /html[1]/body[1]/div[1]/div[1]/div[1]/div[1]/form[1]/div[3]/button[1] uniquely identifies the sought web element within the source code of the changed page, then the system will use /html[1]/body[1]/div[1]/div[1]/div[1]/div[1]/form[1]/div[3]/button[1] to identify the corresponding "button class" value in the changed page source code, which in this case is "login101-form-btn", and the system will return the new value of "login101-form-btn" as the new web element locator at steps 26 and 27 and 18. Any other value associated with the missing web element locator, if it can uniquely identify the sought web element on the changed webpage, can be used to identify the changed value of the original web element locator that is currently missing and can be returned.

Therefore, the related locator based web element rediscovery function 25 could use the value "login" for the link text attribute, or the Relative Xpath of "//button[@class='login100-form-btn']" or the CSS Selector of "div.limiter:nth-child(1) div.container-login100 div.wrap-login100 form.login100-form.validate-form div.container-login100-form-btn:nth-child(4) >button.login100-form-btn", if each can uniquely identify the sought web element on the changed webpage, as a new locator to find the changed value, e.g. "login101-form-btn", for the class attribute, which was the original web element locator.

If the related locator based web element rediscovery function 25 cannot identify any unique locators associated with the missing web element locator that can uniquely identify the sought web element, the system 24 may return a value so indicating, and then at step 26 the system will proceed to the image based element rediscovery function 28.

The image based element rediscovery function 28 involves the use of a hash function or algorithm. In some embodiments, the hashing function is a perceptual hash function or algorithm. A hash function can be used to attempt to determine whether one object matches another object. For some types of objects a bit-by-bit match between the original and the second object is important. However, multimedia objects—such as video, images, and audio—can have different digital representations that look the same or substantially the same to human perception. The different digital representations that look the same or substantially the same to human perception can occur through image processing, such as cropping, compression, histogram equalization, change in resolution up to a certain point, noise removal, sharpening, color correction up to a certain point, etc. Such processing changes the binary representation of the image but may not change the visual perception of the image to a human.

A perceptual hash functions attempts to address the problem that images that are visually the same or similar to the human eye can have different binary representations. The perceptual hash functions are directed to establish the perceptual equality of multimedia content. Perceptual hash function can extract certain features from the multimedia contact and calculate a hash value based on these features. When authenticating, or attempting to determine whether the multimedia object under examination matches an original object, the hash value of the multimedia object under examination is compared to the hash value of the original object. A numerical distance is calculated between the hash value of the multimedia object under consideration and the hash value of the original object, such as by subtracting one hash value from the other hash value. The determination of whether the multimedia object under examination is a perceptual match to the original multimedia object, depends on the hash difference distance between the hash values of the multimedia object under examination and the original object and a predefined threshold for determining whether a given hash difference distance represents a perceptual match. Therefore, a threshold may be predefined or may be set and/or adjusted by the user or administrator. For example, if the threshold value is 100, then in some embodiments, the hash difference distance from 0 to 100 would represent a match, and the hash difference distance above 100 would represent not a match.

In some embodiments, the perceptual hash algorithm is that disclosed in U.S. Patent Application Publication 2016/0182224, which is herein incorporated by reference. In some embodiments, the perceptual hashing algorithm is the Type-II DCT hash algorithm, or the Marr-Hildreth Operator Based hash algorithm, or the Radial Variance or Radon transformation based hash algorithm, or the block mean value based hash algorithm. In some embodiments, the perceptual hash algorithm function(s) is/are that implemented and known as pHash, available at https://www.phash.org/, which is a software library that implements several perceptual hashing algorithms, such as the DCT based hash function, radial variance based hash function, and Marr-Hildreth operator based hash function. A further discussion of perceptual hash algorithms is available in the master's thesis by Christoph Zauner, titled, Implementation and Benchmarking of Perceptual Image Hash Functions, available at https://www./phash.org/docs/pubs/thesis zauner.pdf. In some embodiments, the perceptual hash function is a dhash function, such as the dhash function usable with the python programming language. In some embodiments, the hamming distance, as may be known in information theory, between two perceptual hash values may be calculated to determine a degree of similarity or dissimilarity of the two perceptual hash values.

Other perceptual hash functions can be used. One benefit of hash based comparison of multimedia objects is that comparing hash values of the objects is faster than comparing the multimedia objects themselves.

Figure 12:
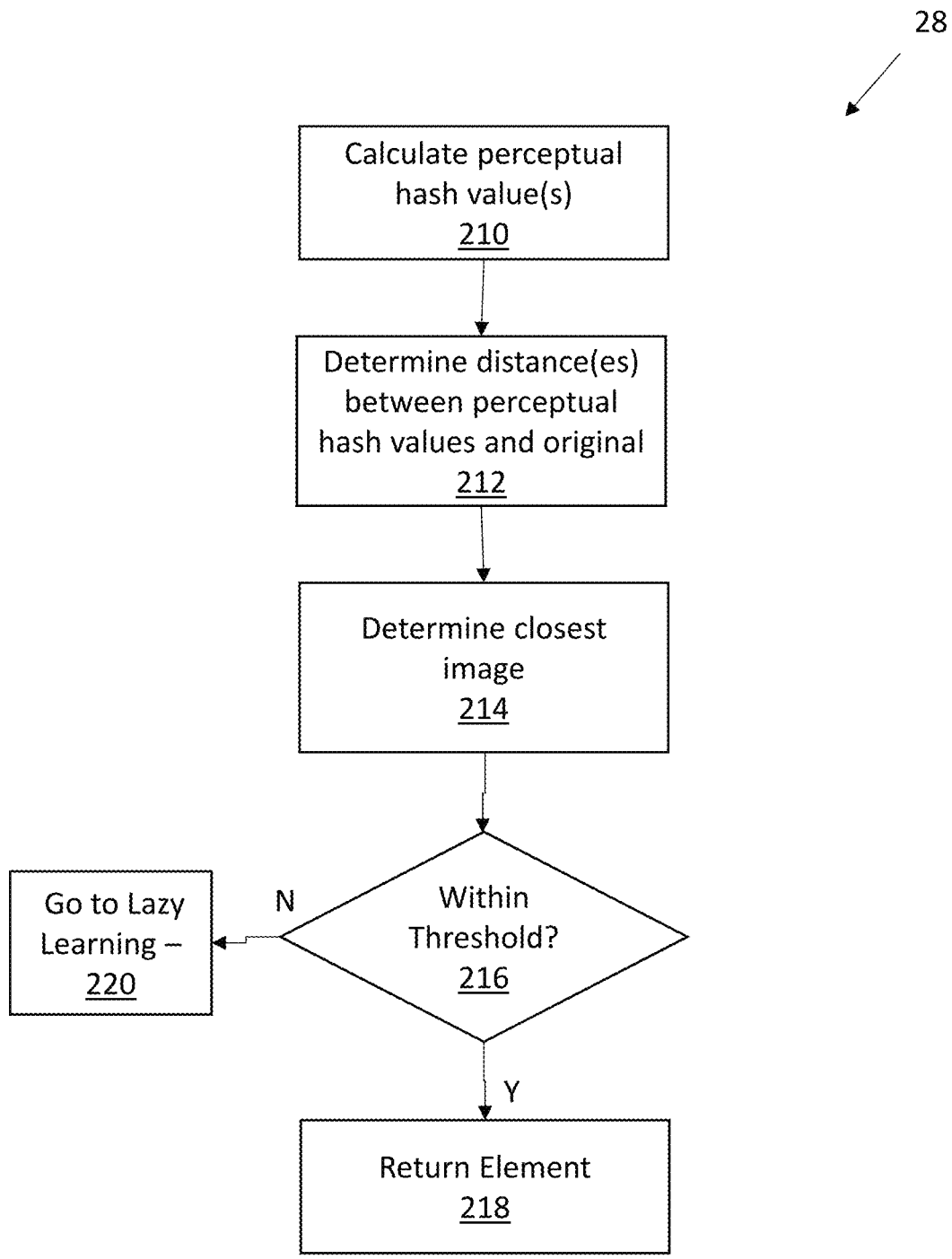
FIG. 12 is a flow diagram of an image based element rediscovery function of the web element rediscovery system.

FIG. 12 shows an embodiment of the image based element rediscovery function 28. At step 210, the process calculates the perceptual hash value for each image saved to the crawler knowledge datastore 100, for the target web page under examination, which comprised the error at step 14. At step 212, the process 28 calculates the difference distance between the perceptual hash value of each image saved to the crawler knowledge datastore 100, for the target web page under examination, and the original perceptual hash value of the original image corresponding to the sought element, such as the image provided in field 80, stored in the web element knowledge datastore 48. The difference distance is calculated by subtracting the perceptual hash value of each image saved to the crawler knowledge datastore 100 from the perceptual hash value of the image of the original image or by subtracting the perceptual hash value of the image of the original image from the perceptual hash value of each image saved to the crawler knowledge datastore 100.

If there is more than one image on the target web page under examination, a difference distance value will be calculated for each image on the webpage under examination. Then at step 214, the function 28 determines the closest image based on a consideration of the difference distance values corresponding to each image on the target web page under examination. In some embodiments, the function may sort the difference distance values, such as in ascending order, for ease of finding the closest image. The closest image on the target web page under examination will be the one that has the lowest difference distance as compared to the difference distances corresponding to other images on the target web page under examination.

Then at step 216 the function 28 will determine whether the closest image on the target web page under examination is within a pre-defined threshold distance to be accepted as a perceptual match to the original image. In some embodiments, if the closest image corresponds to a difference distance below or at or below the threshold, then it will be accepted and returned at step 218. In some embodiments, the function 28 will return the element associated with the closest image within the threshold as the sought element. In some embodiments, the function 28 will return a location within the target web page of the sought element 82 associated with the closest image within the threshold. If the closest image corresponds to a difference distance that is above the threshold, then it will not be accepted and the function 28 will return no match, and in some embodiments proceed to the lazy learning based element rediscovery function 30 at step 220.

In some embodiments, the system will capture an image, for image fields 80, 200, associated with each element in the data stores 48, 180, even if the element is not an image file. For example, the system will capture an image of the login button, such as shown in FIG. 6.

In some embodiments, the system uses other image comparison functions or algorithms, other than or in addition to perceptual hash algorithm, such as autoencoders (e.g. variational autoencoders), convolutional neural networks with triplet loss or deep triplet quantization, attentive deep local features, decoupling diffusion/offline diffusion, domain adaptive hashing, and/or others.

Figure 13:
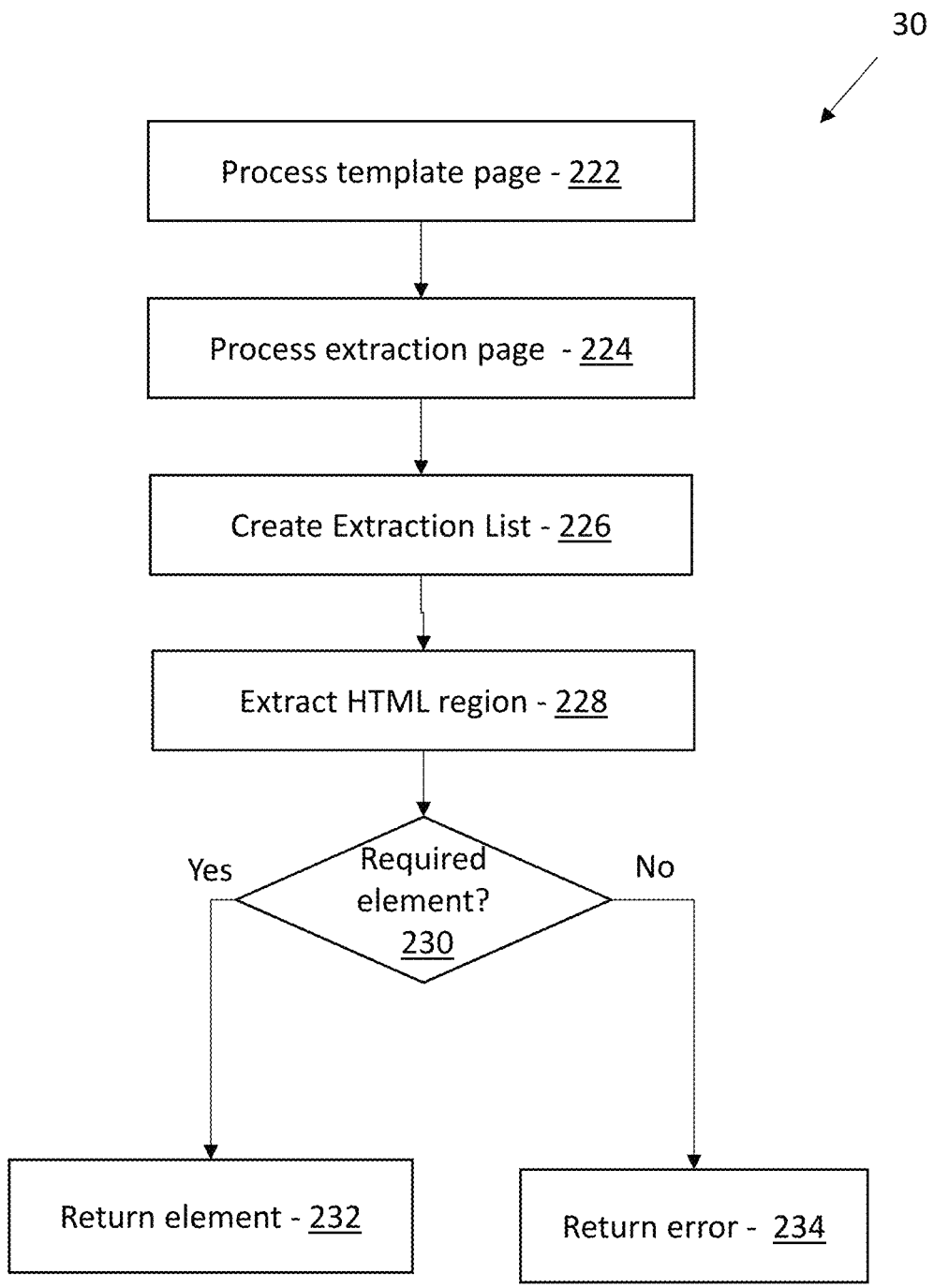
FIG. 13 is a flow diagram of a lazy learning based element rediscovery function of the web element rediscovery system.

One embodiment of the lazy learning based web element rediscovery function 30 is shown in FIG. 13. At step 222 the function 30 processes the template or source html page, such as the html page of FIGS. 9-11. In some embodiments, the template page or source web page is processed when the function 30 is called or begins. In some embodiments, the template or source html page is processed before the function 30 is called or begins. At step 224 the extraction page is processed. The extraction page may also be referred to as the target page or the webpage under examination. In some embodiments, the processing of the source web page is the same or similar to the processing of the extraction page. In some embodiments, the source web page and the extraction page are processed in parallel or in reverse order.

Figure 14:
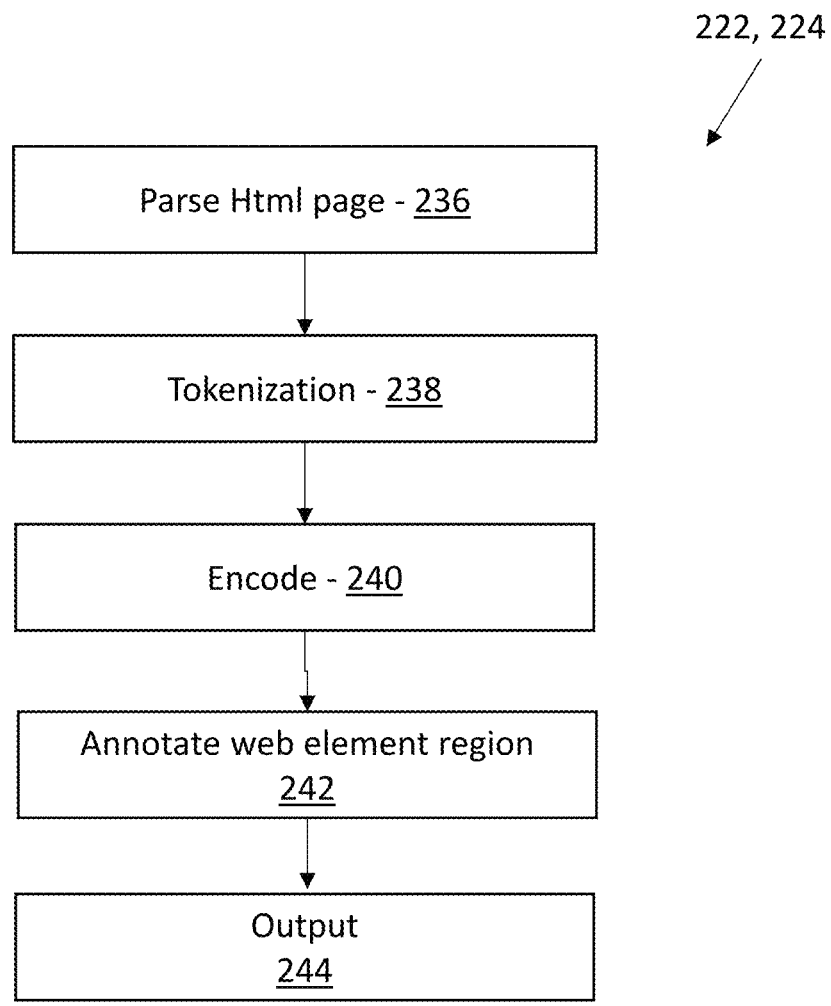
FIG. 14 is a block diagram of a page processing function of the web element rediscovery system.

FIG. 14 show exemplary page processing functions 222, 224 for processing the source web page and the extraction page. However, the processing function 224 for processing the extraction page does not include annotating the web element region function 242, which is done with the source web page.

Figure 15:
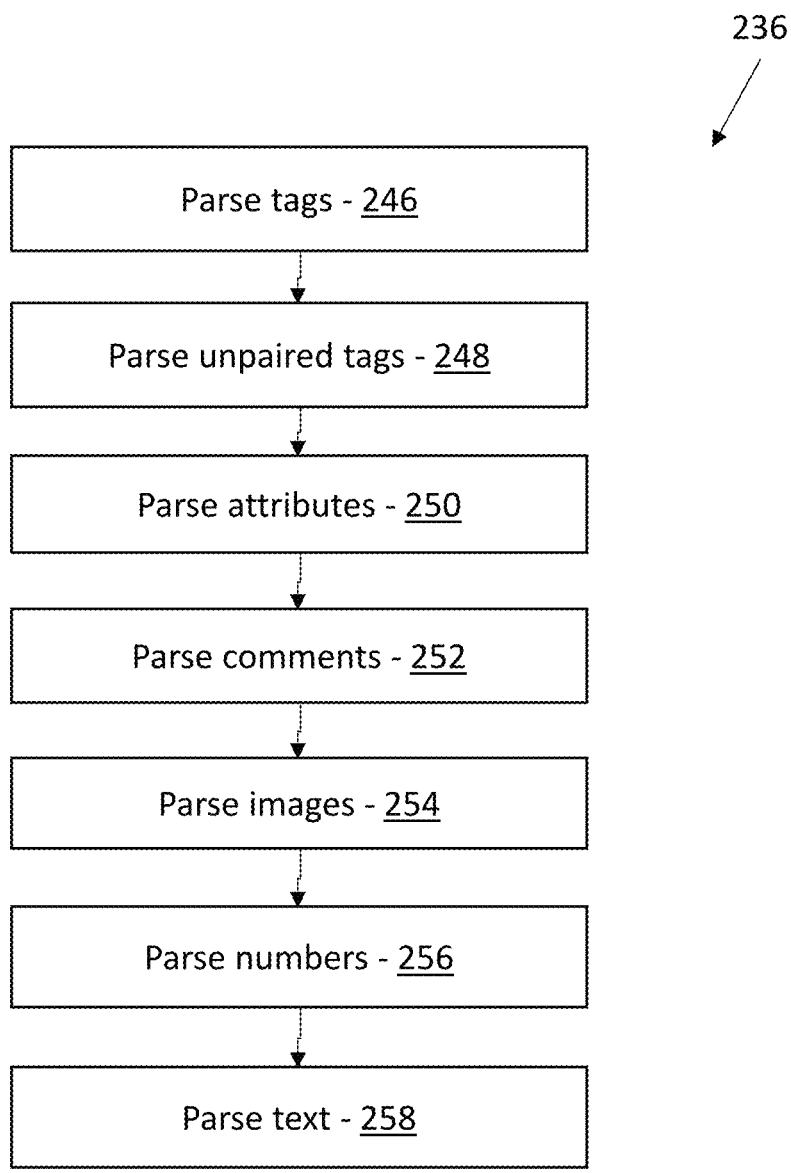
FIG. 15 is a flow diagram of a parse function of the web element rediscovery system.

The code, such as html code, of the page is parsed by a parsing function 236. The parsing function 236 may call multiple lower level or other parsers, 246, 248, 250, 252, 254, 256, and 258. While the flow order in FIG. 15 is shown as 246, 248, 250, 252, 254, 256, and 258, these parsers can be called in any order or in parallel.

The tag parser 246 parses and sends to the tokenization function 238 for capture all the html tags from the html page and removes tags that are known to not correspond to the web element sought, such as script, base, style, and noscript tags. The captured html tags, that are not removed, are saved to a token database 260, 251 in the datastore.

The unpaired tag parser 248 checks the html page for all the unpaired tags and closes unpaired tags found in the page by adding a closing tag in the appropriate location on the page. Many html tags require a corresponding closing tag. For example, the html tag <body> should have a closing body tag, usually in the form of </body> at the end of the body section of the html page. The closing tag is usually in the form of a slash, "/" preceding the word used in the opening tag, e.g. "body", all enclosed in angle brackets, < >. Further examples of closing tags are </head> 172 which closes the opening head tag <head> 108, </div> 174 which closes the opening div tag <div> 120, </div> 176 which closes the opening div tag <div>122, </html> 170 which closes the opening html tag <html lang="en"> 104.

The code of FIGS. 9-11 show further opening and closing tags. Therefore, an unpaired tag is an opening html tag that should have a closing tag in the html code, but does not. For example, if the closing </head> 172 tag was deleted from the code of FIG. 9, then the opening <head> 108 tag would be an unpaired html tag because an opening <head> tag should be followed in the code by </head> in the code at some point. Similarly if closing </div> 174 tag was deleted, then the opening <div class="limiter"> tag would be an unpaired tag because its corresponding closing </div> would not be found later in the code. The unpaired tag parser therefore adds a closing tag in the appropriate location within the code following any unpaired opening tag, so that each opening tag that should have a matching closing tag within the code at an appropriate location, does in fact have a corresponding closing tag.

Figure 18C:
FIG. 18C is a block diagram of first embodiment attribute dictionary.
Figure 18D:
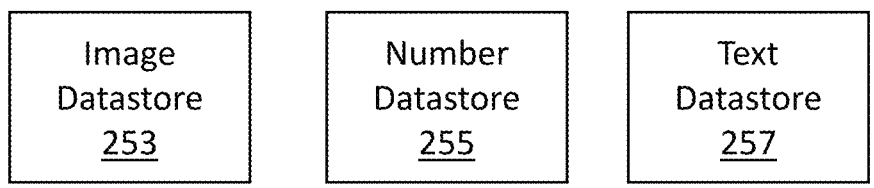
FIG. 18D is a block diagram of certain datastores.

The attribute parser 250 parses the attributes of each tag of the webpage and adds those attributes to an attribute dictionary 251, which can be used in annotating the template page. Data for the attribute dictionary 251 comprises the key value pair for each attribute and field of the corresponding tag. For example if the tag is button tag 160, such as shown in FIG. 10, then class name "login100-form-btn" will be the button class pair resulting in the key value pair of {class: login100-form-btn} as shown in FIG. 18C. As a further example, if the tag is the input tag 144, then it will have the following key pair attributes associated with it in the attribute dictionary 251: {class:input100}, {type:text}, {name: email}, and {placeholder=email}. Therefore, the system will store the attributes associated with each tag of the webpage in the attribute dictionary. The attribute dictionary can be a database or a string variable, or other data structure. In some embodiments the attributes are those shown in fields 64, 66, 68, 70, 78, and 184, 186, 188, 198. In some embodiments, the web element knowledge datastore 48 and the crawler knowledge datastore 100 each comprise the attribute dictionary corresponding to the source web page and the extraction page, respectively. In some embodiments, the system has separate attribute dictionaries for the source web page and the extraction page. The attribute dictionary 251 shown in FIG. 18C provides tag, attribute, and value columns where the system will save the corresponding information. The tag may be represented by its value "button" or its index, or other uniquely identifying value. The dictionary 251 is shown with one row of data, but can contain multiple and many rows of data. In some embodiments, the system comprises multiple attribute dictionaries, such as one for each tag of the html page. In such case the "tag" column of 251 is not used and each attribute dictionary is associated with the corresponding tag by the attribute dictionary title (e.g. button44.attribute.dictionary) or other association.

The comment parser 252 parses all the comments and removes them from the html page. In some embodiments, a comment in html code begins with an open angle bracket, an exclamation point and two dashes or hyphens, i.e. <!--, and closes with two dashes or hyphens and a closing angle bracket, e.g. -->. Comments are not used by web-browsers to render the html page, but are visable when viewing the code. Exemplary comments are shown between the meta tags 114 and the link tags 118 in FIG. 9. Comments are also shown in FIG. 11.

The image parser 254 identifies images from the html page and saves each identified image to an image database 253 in a datastore 335. The numbers parser 256 identifies numbers within the html page and saves these identified numbers to a number database 253 in a datastore 335. The text parser 258 identifies text within the html page and saves this identified text to a text database 257 in a datastore 335.

After all of the applicable parsers have parsed the html page, the parsed html page is returned to function 30 at steps 222, 224 as applicable for further processing.

The tokenization function 238 then processes the parsed html page. The tokenization function identifies all the html tags from the parsed html page. The function 238 then makes the html tags into a list, table or other suitable format, of tokens. In some embodiments, the html tags are saved to a token dictionary in a datastore 335. In some embodiments, the table 260 is a token dictionary and saved to the datastore 335.

Figure 16:
FIG. 16 is a first table portion showing exemplary tokenization and encoding of the html code of FIGS. 9 to 11.

The encoding function 240 comprises a position encoding function that associates a number, such as an index number, with each token. In some embodiments, the associated number is an integer. FIG. 16 shows an exemplary tokenization and encoding, in table 260 form, of the html code shown in FIGS. 9 to 11. The table is shown in two portions for ease of fitting on two page of FIGS. 16 and 17. The reference number column of the table 260 would not necessarily be used or present in the system, but is presented in FIGS. 16 and 17 for the ease of associating the identified tags with the tags identified by reference numeral in FIGS. 8 to 11. In some embodiments, the each row of the table 260 would be a record entry in the token dictionary stored on the datastore 335.

In some embodiments, the encoding function comprises a type encoding function that associates a type value to each tag, as shown in FIGS. 16 and 17. The type value corresponds to the type of tag. In some embodiments, the type of tags include, an open tag, a close tag. In some embodiments, the type of tags include, an open tag, a close tag, and a tag that does not need or have a close tag by default. In some embodiments, an open tag is represented by a 1, a close tag is represented by a 2, and a tag that does not need or have a close tag by default is represented by a 3. In some embodiments, these representative numbers, e.g. 1, 2, and 3, corresponding to tag types are each left shifted 24 bits. When 1 is left shifted 24 bits it results in the binary number 16777216, when 2 is left shifted 24 bits it results in the binary number 33554432, and when 3 is left shifted 24 bits it results in the binary number 50331648. Other representative numbers could be used.

The type column in table 260 comprises 1, 2, and 3 corresponding to an open tag, a close tag, and a tag that does not need or have a close tag by default, respectively. For example, head tag 108 is an open tag and has a type value of 1 at index 1 of the table 260. The i tag 150 is an open tag and has the type value of 1 at the index of 29 of the table 260. The i tag 151 is a close tag and has the type value of 2 at the index of 30 in the table 260. The img tag 127 and input tag 144 do not have a close tag by default in html, therefore each has a type value of 3 at indexes 20 and 26, respectively.

As shown in FIGS. 16 and 17, the tokenization function takes each opening tag remaining in the parsed html page, places it in a list or table or other suitable format and the encoding function associates each tokenized tag with an index integer, as shown in the index column, and a and a type value, as shown in the type column. In the example of the code of FIGS. 9 to 11, the code has 62 tokens corresponding to the tags.

FIGS. 18A and 18B shows the 62 tags identified by their position index value from table 260, with each tag type represented in 24-bit left shifted values 16777216, 33554432, and 50331648, corresponding to 1, 2, and 3, respectively.

The annotate web element region function 242 annotates or marks the region of the html code of the template or source web page where the web element is located. Annotating involves inserting an annotating element within the code. The system is trained, at least in part, by the annotation web element region function, which provides the system with a mapping of the location of the region in which the element is present within the template page. For example, the following code excerpt is from FIG. 10, where the annotating element is healer_marked_region="["annotations": {"content": "field1"} }":

```
<div class="container-login100-form-btn">
    <button class="login100-form-btn"
    healer_marked_region="{"annotations":
    {"content": "field1"}}">
    Login
    </button>
</div>
```

The annotation element—e.g. healer_marked_region="{"annotations": {"content": "field1"} }"—is placed within the <button class="login100-form-btn"> tag. However, other annotation elements can be use and can be system, administrator, or user defined. In some applications, the annotation element is data-healer-annotate="{" annotations": {"content": " name"} }.

To insert the annotating element within the code, the annotate web element region function must find the element to be annotated within the html page. To do so, the function searches the html page to find the sought element.

In some embodiments, to annotate the webpage, the system will parse the html page and convert the entire page in to regions or fragments. The system will pass the data to the annotate web element region function 242, which comprises the key value pair for each attribute field corresponding to the sought web element. For example, if the sought web element is the button at tag 160, then the key value pair for the class name element of the corresponding tag would be {class: login100-form-btn}, which would be passed to the annotate web element region function. As another example, if the sought was element is the Username/Password? at tag 164, then the key value pair for the class name element of the corresponding tag would be {class: txt2} and the key value pair for the href element of the corresponding tag would be {href;#}.

Therefore, the annotate web element region function will attempt to find the portion of the webpage where there is a matching value for each attribute provided to the annotate web element region function that corresponds to the sought web element. In some embodiments this involves a text comparison or scoring between the attribute values provided and the attributes of the tags of the html page.

In some embodiments, the system error-checks that there is an attribute dictionary, and makes a copy of the template page to annotate, before calling the annotate function. Then annotate function called to annotate the html page.

In some embodiments, the annotate web element region function 242 takes two inputs/arguments: a field and a score function. In some embodiments, the annotate function is called in a for loop for every attribute, value pair in the attribute dictionary 251. The annotate function may call a score function that receives two arguments/inputs: a template page fragment and a htmlpage and returns a relevancy score, which in some embodiments is a float value, indicating how relevant is the provided fragment of the html code of the template page. In some embodiments, a relevancy score of zero means the fragment is irrelevant and higher scores means that the fragment is more relevant.

In some embodiments, the system arranges an ordered list of relevancy scores, such as by implementing a select function that returns a list of match scores in ascending or descending order. The fragment with the highest match score is annotated. In some embodiments, if there are two or more fragments of the html page that have the same relevancy score, the system chooses the first fragment for annotation. In some embodiments, if there are two or more fragments of the html page that have the same relevancy score and that relevancy score is the highest, then the two or more fragments are all annotated.

The relevancy score is representative of the degree of matching of the text/characters and therefore the similarity of the compared text/characters. If the sought element was the email field 52, then the "input100" and "email", corresponding to tag 144, would be values that are passed to the annotate function.

In some embodiments, the score function is or can be represented by the following function: score function=len (inputtext))/len(fdata)−(1e-6*fragment.start. Inputtext is the text input provided to the score function, such as the attribute value(s) or user-visible text following the tag.

Fadata is a fragment of the html page (e.g. template page) that is under comparison by the score function, A fragment can be a tag, including the tag attributes. Fragment.start provides a start location or index for the fragment of the html page template page. In some embodiments, the fragment.start is the character count location of the start of the fragement within the html page from the beginning of the html page. Len(text) returns the length of the text input. Len(fdata) returns the length of the fragment. In some embodiments, the length returned by the Len( ) function may comprise a count of the number of characters of the input or a count of the number of spaces and characters. Therefore the closer the length of the inputtext is to the length of the fragment the higher that the value of len(inputtext) will result, indicating a higher similarity. 1e-6 means $1\times10^{-6}$ which equals 0.000001. Therefore, 0.000001 times the character count location of the start of the fragment results in a relatively small number that is subtracted from the value of (len(inputtext))/len(fdata)). This subtraction of a small number helps prevent identical scores and provides location based adjustment to the score calculation. While 0.000001 has been used as a constant to multiply the fragment start by, other constants could be used.

In some embodiments, text similarity as considered by the score function can be calculated by one or more of Variational Auto Encoder (VAE), LSI and Cosine Similarity, LDA and Jensen-Shannon distance, Word Mover Distance, Universal sentence encoder, Siamese Manhattan LSTM, K-means, Cosine Similarity, chi squared similarity. The text under consideration by the score function can be converted to numbers (.a.k.a. embedded or encoded) for the purposes of one or more of the forgoing scoring functions, by various methods or algorithms including, but not limited to, Bag of Words (BoW), Term Frequency-Inverse Document Frequency (TF-IDF), Continuous BoW (CBOW) model, Skip-Gram model embedding (SkipGram), or Pre-trained word embedding models, such as Word2Vec (by Google), GloVe (by Stanford), fastText (by Facebook), Poincarre embedding, Node2Vec embedding based on Random Walk and Graph, or any context based embedding such as the ones using in transformers (e.g. BERT or GPT-2).

At step 244, the system will output and/or save the parsed, tokenized, encoded, and annotated webpage by the system, such as a database. When the parsed tokenized, encoded, and annotated webpage is the original web page, then the saved page is referred to as the template page. When the parsed, tokenized, and encoded page is the web page under examination, then the saved page is referred to as the extraction page. The web page under examination is not annotated by the annotate web element region function 242.

The system comprises a create extraction list function 276 which is executable to create an extraction list. The create extraction list function 276 is called at step 226 of FIG. 13. The extraction list is an ordered list of extractors to be run or called by the function 30. The extraction list is created by processing the template page. In some embodiments, DOM tree of the template page is used for creating the extraction tree, such as the DOM tree shown in FIG. 8.

Figure 20:
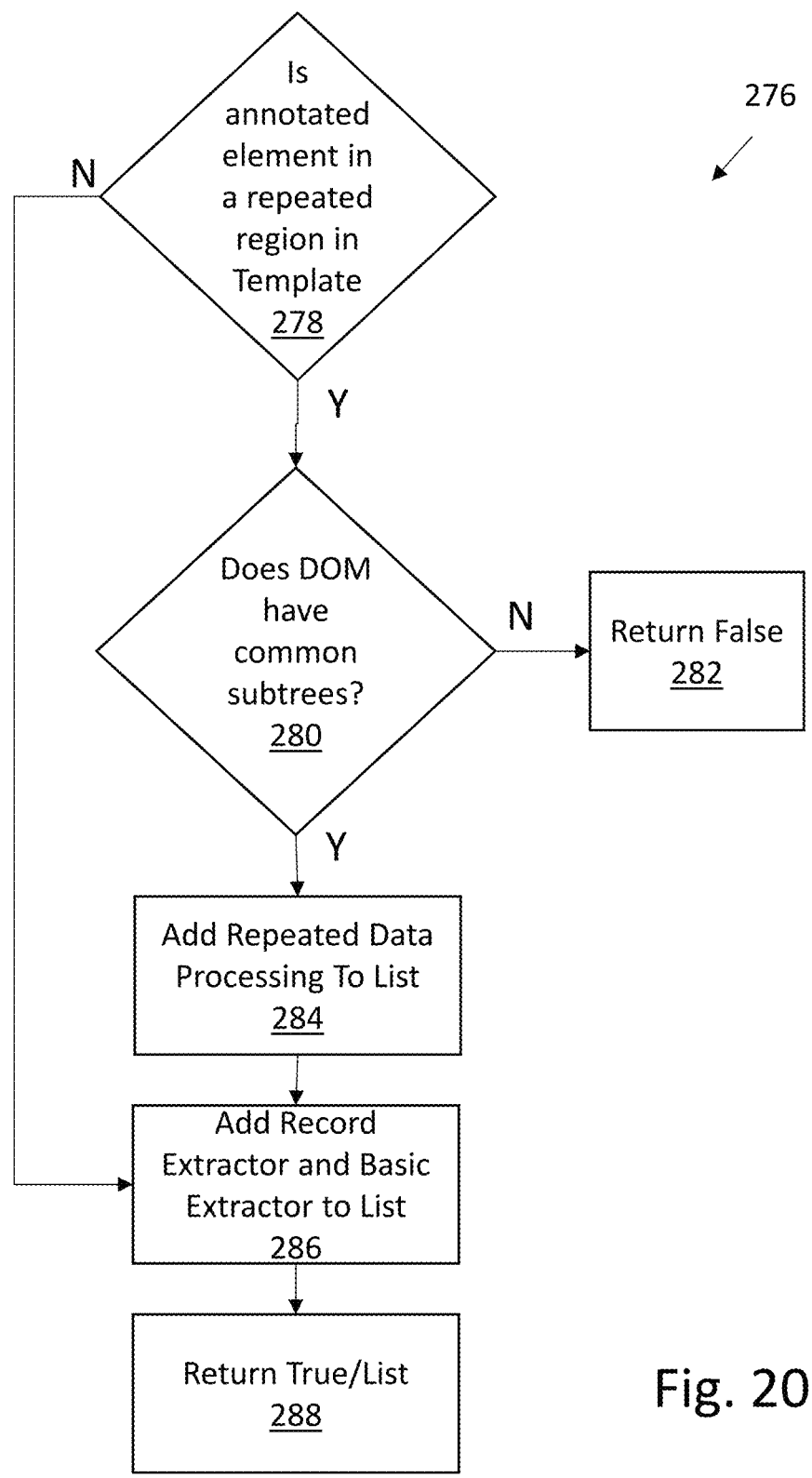
FIG. 20 is a flow diagram of a create extraction list function of the lazy learning based element rediscovery function.

One embodiment of the create extraction list function 276 is shown in FIG. 20. At step 278 the system determines whether the annotated element, such as button element 59, is in a repeated region of the web page. For example, nodes 132 and 134 of FIG. 8 represent regions of the DOM tree shown in FIG. 8 having a repeated series of html tags. Each node has the same tag series and structure to the terminating child element of each node, namely, div, input, span, span, i. In the case of button element 59 of FIG. 6, the marked element 59 is not within a repeated region. Therefore the function 276 will proceed to step 286 and add the record extractor and basic extractor to the ordered list of extractors. Then the function will return at step 288 the order list of extractors. In one embodiment, in the case where the marked element is element 59, the ordered list of extractors would be: record extractor and basic extractor.

In the case where the marked element is within repeated series of tags in the template page, such within the subtree of nodes 132 or 134, then at step 280 the system may optionally error check that the DOM tree contains common subtrees, which in this case it does at nodes 132 and 134, and then proceed to add repeated data processing extractor(s) to the list of extractors at step 284.

In some embodiments, the repeated data processing extractor(s) are added to the list with indices for the subtree structure corresponding to the repeated portions or subtrees of the template page. For example, when the repeated portions or subtrees are nodes 132 and 134, the repeated data processing extractor can be added with indices 25 to 32 corresponding to node 132 and tags 132, 144, 146, 148, 150, 151, 149, and 155, as shown in FIG. 16 and FIG. 10. This could be represented as repeatedDataExtractor(25:32). The repeated data processing extractor can be added with indices 33 to 39 corresponding to node 134 and tags 134, 152, 154, 156, 158, 157, and 135, as shown in FIG. 17 and FIG. 10. This could be represented as repeatedDataExtractor(33:39).

In some embodiments, the repeated data processing extractors include an adjacent variant extractor 272, which is called by or after the repeated data extractor function 270.

In some embodiments, the create extraction tree function comprises the following steps described in pseudocode:

```
1.  Function create_extraction_list(templatePage, tokenDictionary)
2.  domTree = build DOM tree for templatePage
3.  listExtractors = initialize the list of extractors as empty
4.  if the annotated element is within a repeated region:
5.      for each element in the domTree: #Traverse DOM:
6.          If element.children is not empty:
7.              if commonSubtree(element) is True:
8.                  add repeatedDataExtractor to listExtractors with indices of the subtree
9.                  add AdjacentVariantExtractor to listExtractors
10.             else return False
11. add recordExtractor to listExtractors with indices of the annotated region
12. add basicTypeExtractor to listExtractors with indices of the annotated region
13. return True
14. Function commonSubtree(element):
15.     if element.children are empty
16.         return True
17.     else if for all nonempty element.children:
18.         checkRoot = compare the root nodes of the childrenElement
```

```
19.        checkSubTree = commonSubtree (child)
20.        return checkRoot && checkSubTree
21. return listExtractors
```

At line 2 the function will build a DOM Tree, such as tree 102 of FIG. 8, from the template page, or will call a function to build the DOM Tree. In some embodiments, line 2 is omitted is the DOM Tree has already been created when the build extraction list function is called. Line 3 initiates an empty list. In some embodiments, this step of line 3 may not be necessary, for example, if a list is empty by default.

At line 5, if annotated element is within a repeated region of the template page, then the function will add repeated data processing extractors. The function does so by, at line 5, traversing the DOM tree in a for loop. Therefore, the if-statement of line 5 corresponds to step 278 of FIG. 20.

Traversing may be understood as the function considering each element of DOM tree 102. In some embodiments, the create extraction list function starts with the root node of the DOM tree, such as 104 of FIG. 8, and performs a preorder traversal of the DOM tree. A preorder traversal first starts with the root node, then proceeds to the left side nodes, then proceeds to the right side nodes. Therefore, a preorder traversal has a root, left, right traversal order.

The create extraction tree function can dynamically control the order of applying different extractors to the extraction page. The order of applying the extractors, i.e. the extraction list, is obtained by finding the common subtrees within the DOM tree, which is shown at lines 14 to 20 of the pseudocode above. For each element of the DOM tree, the create extraction tree algorithm checks if that element has multiple matching subtrees within the DOM tree beginning at the first level below the element. The function may do this by calling the Common Subtree function described at lines 14 through 20. The common substree function uses recursive calls to compare sub trees under the given element within the DOM Tree and to find matching subtrees therein. The recursion of the common substree will exit when the condition of line 15 is true.

So long as the element under consideration has children below it, as checked by line 18, the function will, at line 19 compare the root children node of the element under consideration to see if any two root children nodes match. If any two or more root children nodes match, the checkRoot function at line 19 will return true. At line 20 such subtree of each of the root children nodes are checked for a match by the recursive call.

For example, if the element under consideration by a particular iteration of the for-loop of line 5 is the form tag 128 of tree 102, when there exists a child element under the element considered as checked at line 6, then at line 7 the commonSubtree function will be called passing reference to the form tag 128. At line 15 of the commonSubtree function the if statement "if element.children are empty" is false because the form tag 128 has children elements or nodes under it, such as the span tag 130, and div tags 132, 134, 136, 138, and 140. At line 17 for the nonempty children of Form tag 128, e.g. the span tag 130, and div tags 132, 134, 136, 138, and 140, the function will compare the root nodes of the childrenElements at line 16 and will make recursive calls to the commonsubtree function passing the children of the element under consideration, form tag 128 at line 19. At line 18, the CheckRoot function will compare the root node of the childrenElements. Therefore, at line 18, the function will compare each of the span tag 130, and div tags 132, 134, 136, 138, and 140. This will result in finding that div tags 132, 134, 136, 138, and 140 match because they are all open div tags. Then at line 19 the function will make a recursive call with the child elements. That recursive call(s) will ultimately determine that the branches beginning at div tag 132 and div tag 134 match. Therefore, line 20 will return true indicating that is at least some matching children trees under the form tag 128. Those indices will span from the open form tag 128 to the close form tag 171. In the case of the table 260 of FIGS. 16 and 17, the indices corresponding to the open form tag 128 is 22 to the close form tag 171 is 53.

Therefore, in some embodiments, at line 8 the function will add repeatedDataExtractor(22:53) to the list of extractors. At line 9, the function will add the adjacent variant extractor function 274.

The example of FIG. 8, only includes one set of repeated data, i.e. repeated sets of tags to the terminated children nodes of each branch, at nodes 132 and 134, however, if the corresponding page has other repeated data, the for loop a line 5 would find and add the repeated data extractor again to the extractor list for the indices of the other repeated data within the template page. The repeated data at nodes 132 and 134 is matched in each branch starting at 132 and 134, respectively, all the way down the branch to the terminating bottom nodes 150, 158 of the branches, respectively. In other words, tag 134 matches tag 134, tag 144 matches tag 152, tag 146 matches tag 154, tag 148 matches tag 156, tag 150 matches tag 158, all in branch order. Therefore, repeated data, could be referred to as repeated branches of the DOM tree 102. Repeated data can include branches that are the same but are not immediately adjacent to each other in the DOM tree. Therefore, there could be repeated calls to the repeated data extractor with different or indices and the repeated data extractor and the adjacent variant extractor can be listed multiple times in the extractor list.

After considering the repeated data at lines 4 to 10, the create extraction tree function adds the record extractor function 274 to the list of extractors and then the basic extractor 264 to the list of extractors each with the indices of the annotated or marked region within the template page. In some embodiments, the record extractor and basic extractor use the indices of the annotated or marked region as described below.

In some embodiments, when the annotated element is not within a repeated region in the template page, then the list of extractor may be: record extractor and basic extractor. When the annotated element is within a repeated region in the template page, then the list of extractors may be: repeated data extractor(indices first range of repeated data) 270 and the adjacent variant extractor(indices first range of repeated data) 272, record extractor(indices of the annotated region or indices returned by the adjacent variant extractor), and basic extractor(of the region to extract basic data such as attributes, text, or numbers). If there is more than one set of repeated tags, the list of extractor will include multiple calls to the repeated data extractor and the adjacent variant extractor with the indices corresponding to each range.

Figure 19:
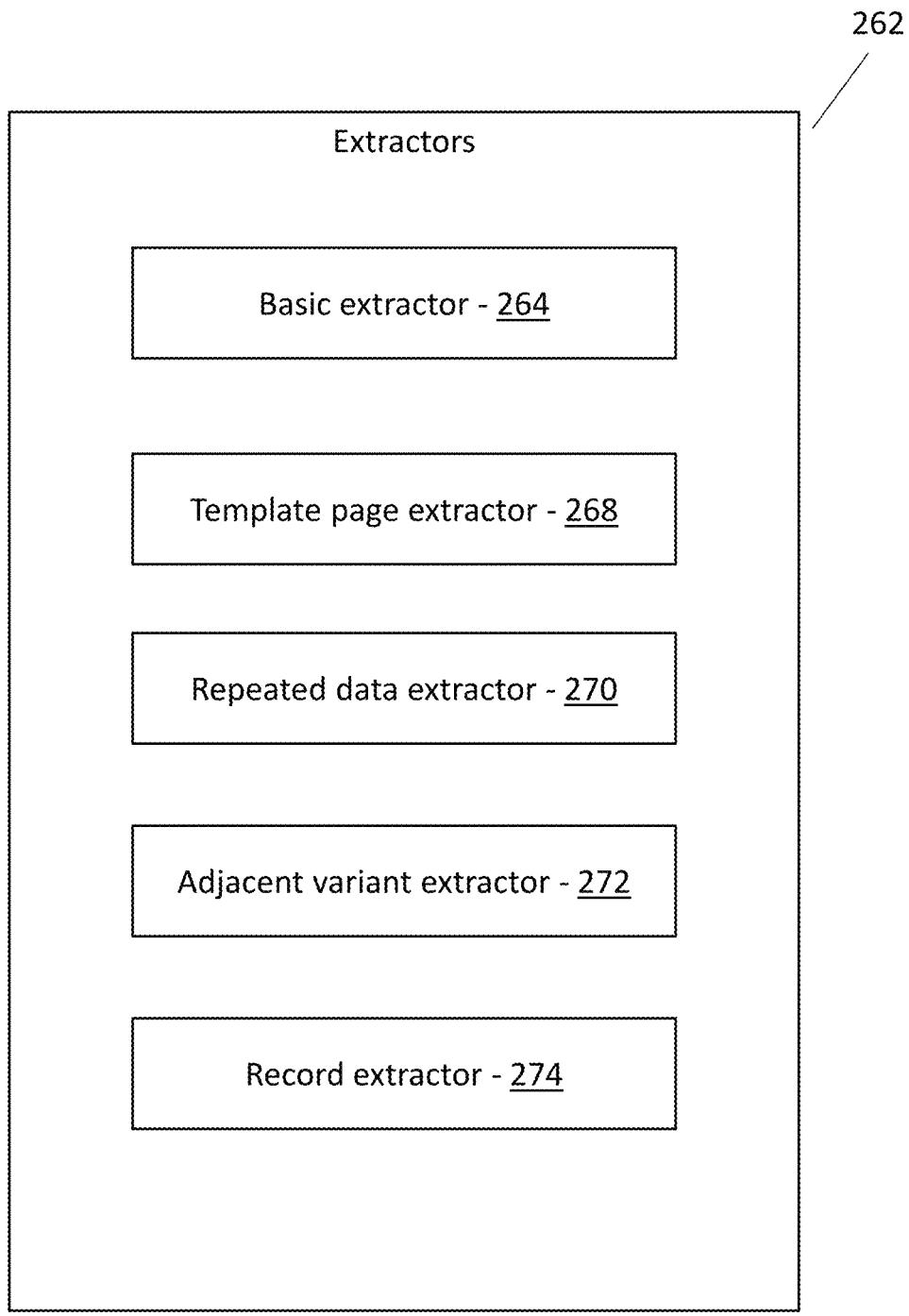
FIG. 19 is a block diagram of certain extractor functions of the lazy learning based element rediscovery function.

At step 228, the system executes the region extractors in the order determined by the extraction list. FIG. 19 shows the extractor functions 262, which include the basic extractor function 264, the template page extractor function 268, the repeated data extractor function 270, the adjacent variant extractor function 272, and the record extractor function 274. These extractors, except for the template page extractor function 268, are for application to the target page/extraction page.

The basic extractor function 264 extracts a single attribute corresponding to an annotated element. For example, consider the case where the system sought to extract the name attribute from the following html code segment.

<h1 data-healer-annotate="{"annotations": {"content": "name"}}">x</h1>', u'<div name="Bob"></div>

The basic extractor would be called or applied to the code segment with "name" as an input or argument. Then the basic extractor would return the value "Bob" because it is the value corresponding to the name attribute in the code segment/fragment. The basic extractor may also be provided as in input or argument, the indices corresponding to this code segment for the h1 tag. In some embodiments, the basic extractor can also extract text or numerals or other characters configured to be displayed on the html page and located between tags in the html code. In some embodiments, the basic extractor receive as inputs, an index or indices of the tag, and the attribute type, text, or characters sought to be returned by the basic extractor associated with the tag.

As a further example, consider the case where the system sought to extract the class attribute from the following html code segment

```
<button class="login100-form-btn"
healer__marked__region="{"annotations":
{"content": "field1"}}">
Login
</button>
```

The basic extractor would return login100-form-btn for the class attribute. In some embodiments, the basic extractor would return "login" as the text value within the opening and closing button tags.

Figure 21:
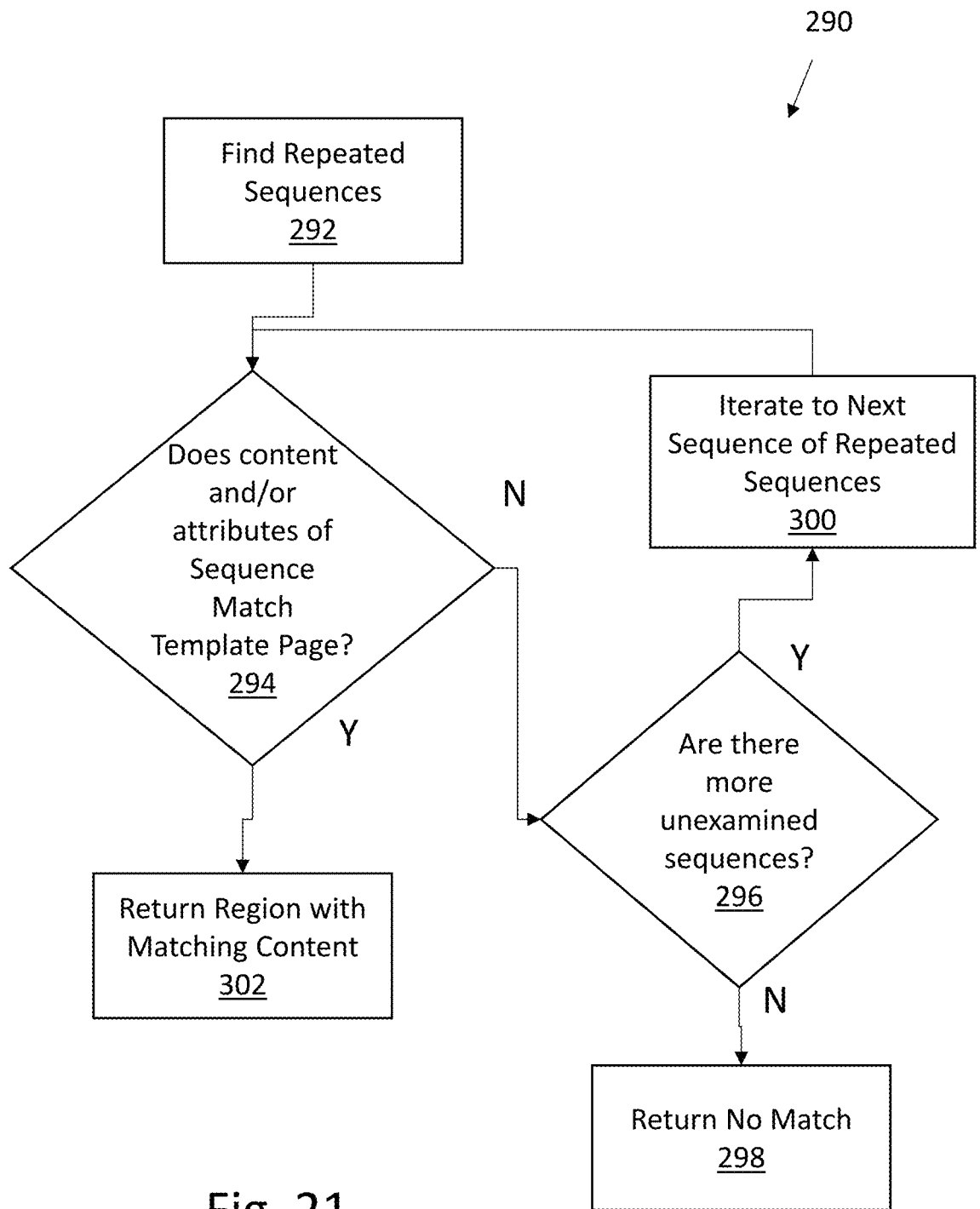
FIG. 21 is a flow diagram of a repeated data extractor function and an adjacent variant extractor function of the lazy learning based element rediscovery function.

FIG. 21 shows an exemplary repeated data extractor function and an exemplary adjacent variant extractor function, collectively, 290. At step 292 the repeated data extractor function identifies repeated sequences within the indices range passed to it. In the case where the index range identified the subtree of form tag/node 128, the indices would be 22 to 53 corresponding to the open form tag 128 and the close form tag 171. Within that range the repeated data extractor function identifies indices corresponding to each repeated tag sequence. Therefore, the repeated data extractor would identify the indices corresponding to node 132 and node 134. Referring to table 260, the indices corresponding to node 132 are 25 to 33, and the indices corresponding to node 134 are 34 to 42.

The repeated data extractor function will pass the indices of each repeated region to the adjacent variant extractor. Then at step 294, the adjacent variant extractor function will compare each iteration of the repeated sequences to the annotated element of the template page. The function will attempt to find the match or nearest match between the annotated element of the template page and the subject matter within the iteration of the repeated sequence under consideration.

In some embodiments, the compare that occurs at step 294 compares the content of the annotated element of the template page to the content within the indices of the repeated region under consideration. In some embodiments, the content information that is located between html tags, rather than within an html tag. For example, the text "Login" is content between the open button tag 160 and the close button tag 161 in FIG. 10. In the example of repeated data at node 132, the code in FIG. 10 shows that there is no content that is located between tags rather than within tags between open div tag 132 and close div tag 155. The same is true for node 134 of FIG. 8 and between open div tag 134 and close div tag 135.

However, if the html code of FIG. 10 had content such as the word "Email" after the div tag 132 and before the input tag 144 and if the target annotated element was tag 132, then at step 294 the function would search the content between tag 132 and tag 155 for the text "Email". And if it found a match of "Email" it would return the indices of the open and close tag corresponding to the matched content "Email". If email was found after div tag 132 and before input tag 144, when the adjacent variant extractor would return the index of div tag 132, which is 25, and the next tag immediately after the opening div tag 132, which is the input tag 144, this is because the content "Email" is between those tags. Those indices may then be passed to the next extractor, such as the record extractor function.

In some embodiments, the compare that occurs at step 294 compares each of the attributes of the tags in the within the indices of the repeated region under consideration, e.g. between the opening div tag 132 and the closing div tag 155, corresponding to indices 25 to 33. If the annotated element in the template page is tag 132, the function will compare the values of each of the attributes of the marked element to values of the corresponding attributes of the tags within the range identified to the adjacent variant extractor as an instance of repeated data. Therefore, the function will compare the value "wrap-input100 valiate-input" with the value of each class attribute within the tags between indices 25 to 33. It will also compare the value "Valid email is required: ex@abc.xyz" with the value of each data-validate attribute within the tags between indices 25 and 33. The function will then identify the tag that corresponds to the most attributes that match values from the marked element of the template page. In this example, that tag is 132, and the indices 25 to 26, would be returned at step 302, identifying the sought element.

In some embodiments, the adjacent variant extractor will call the basic extractor to obtain the content or attributes of a given element and compare the content or attributes to the corresponding content or attributes of the elements within the range identified to the adjacent variant extractor as an instance of repeated data.

If there is a match, then the function 290 will proceed to step 302 and will return the index or indices corresponding to the repeated region that has attributes and/or content matching content in the extraction page at step 302. The index or indices returned by the adjacent variant extractor will be passed to the record extractor so that the record extractor can look for the sought element within the identified index or indices.

If there is not a match at step 294, and there are more unexamined repeated data sequences at step 296, then the function will iterate to the next instance of repeated data at step 300, and the function will proceed to compare the next instance of the repeated data to the corresponding content and/or attributes of the annotated element of the template page as explained above at step 294.

If there is no more unexamined instances of repeated data at step 296, then the function will return no match at step 298. Otherwise, it will find a match at step 294 during at least one iteration through the sequences of repeated data and will return the indices corresponding to the repeated region that has content and/or attributes matching content and/or attributes of or associated with the annotated element in the template page at step 302.

In some embodiments, the repeated data extractor function and the exemplary adjacent variant extractor function can be represented by the following pseudocode:

```
1.  Function RepeatedDataExtractor(start_index, end_index, extraction_page_tokens,
      region_from_template_page):
2.  region_length = (endIndex - startIndex);
3.  Initialize repeated_region as None;
4.  Initialize repeated_region_length = 0;
5.  Initialize index = 0;
6.  create dynamic programming table # dp table - a region_length x region_length matrix
      of size;
7.  for i in range region_length:
8.    for j in range i+1 to region_length:
9.      if the corresponding tokens are equal and
10.     (j-i)th token is less than DP[i-1][j-1] #to avoid overlapping:
11.       dp[i][j] = dp[i-1][j-1]+1 #update dynamic programming table;
12.       if repeated_region_length is less than dp[i][j]:
13.         repeated_region_length = dp[i][j];
14.         update index = max(i, index);
15.     else update dp[i][j] = 0;
16. if have a non empty result ie, repeated_region_length > 0 :
17.   for i in range (index - repeated_region_length) to index:
18.     append the repeated tokens to repeated_region;
19. initialize start_index and end_index for repeated regions to zero;
20. for all occurrences of repeated_region in extraction_page_tokens :
21.   get the start_index and end_index of the repeated region;
22.   call AdjacentVariantExtractor function with the start_index and end_index of the
        repeated region;
23. Function AdjacentVariantExtractor(start_index, end_index, region from template page):
24.   if the contents and/or attributes of region bound by start index and end index matches
        that of the sought region from the template page;
25.   return start_index and end_index of the html region containing the element;
```

The forgoing embodiment of the repeated data extractor function and the adjacent variant extractor function uses a bottom up memorization technique to find multiple occurrences of the longest repeated non-overlapping html regions from the html tags (tokens) between given start index and end index. The function uses a dynamic programming technique to find the repeated regions, such as the ones that might appear in a table of a webpage. Then at line 22 the start index and the end index of each repeated region is passed to the adjacent variant extractor, which compares the content and/or attributes within the index or index range to the content and/or attributes from the annotated element of the template page to attempt to find a match and identify tag (and/or index range of a tag) corresponding to the marked element of the template page.

Figure 28:
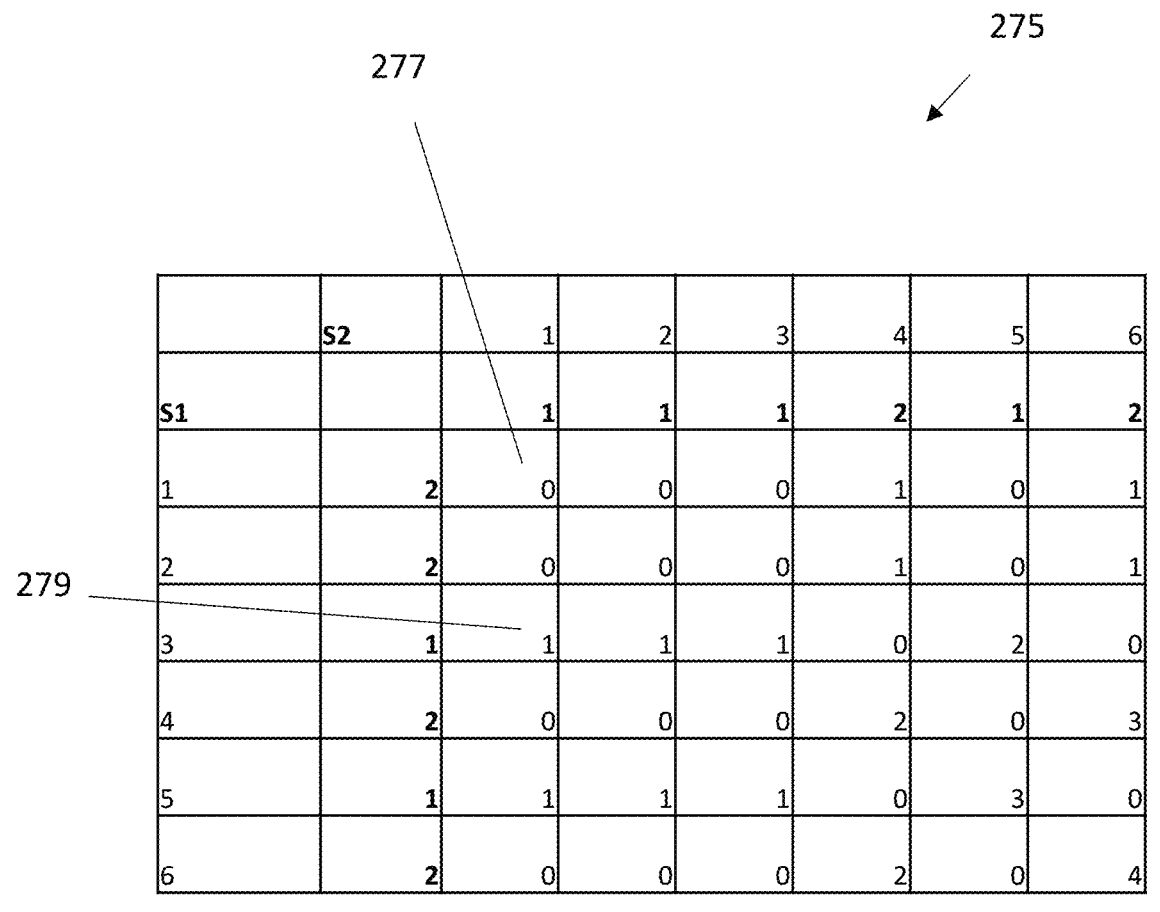

FIG. 28 shows a dynamic programming table 275 using the dynamic programming technique of the embodiment of repeated data extractor function pseudocode above. The table 275 has a top row showing column numbering from 1 to 6 for ease of reference. The table 275 has a first column showing row numbering from 1 to 6 for ease of reference. However, the top row and first column, need not be used in implementation. The first string S1 of html tags, i.e. 1 1 1 2 1 2 is shown in the row identified by S1. The second string S2 of html tags, i.e. 2, 2, 1, 2, 1, 2 is shown in the column identified by S2.

At line 1 the repeated data extractor function receives the following information: the start index of the repeated data region, the end index of the repeated data region, the tags (tokens) from the extraction page, and the tags(tokens) from the template page of the repeated data region. In some embodiments, this information is passed to the function. In some embodiments, rather than passing the information to the function, the information is otherwise available to the function. At lines 2 to 5 certain variables are created and/or their initial values are set. The region_length is the region length distance between the end index and the start index. The region length distance can be the number of html tags or indexes between the end index and the start index, which can be inclusive of the end index and/or the start index.

At line 6 a dynamic programming table is created having region_length number of rows and region_length number of columns, e.g. a region_length×region_length sized table. In the example of table 275, the region length is 6 as shown by the length of the tag string S1. Therefore, in the case of table 275 the dynamic programming table is a 6×6 matrix. A cell in the table can be represented by the row and column positioning. The dynamic programming table may be abbreviated DP or dp. Therefore a cell in the table can be represented as dp[column number][row number] or dp[i][j] where i is the column number and j is the row number. The column number represents the encoded value of the corresponding tag of the first string. Therefore, column 1 represents the first value, e.g. "1", of string S1. Column 2 represents the second value, e.g. "1", of string S1. The row number represents the value of the corresponding tag of the second string. Therefore, row 1 epresents the first value, e.g. "2", of string S2. Row 2 represents the second value, e.g. "2", of string S2.

The for-loops at lines 7 and 8 step through each of the row and column cells to determine at line 9 whether there is a match between the value at the position of the column from S1 and the value of the position at the row of S1. When the values at the position of the column from S1 is equal to the value of the position at the row of S1, then at line 11, the system takes the value of the upper left diagonally adjacent cell, e.g. dp[i−1][j−1], and adds 1 to it and saves it to the cell, e.g. dp[i][j]. At lines 12 and 13, if the current value of repeated_region_length is less than the value of dp[i][j], then repeated_region_length is updated to the value of dp[i][j]. Therefore, repeated_region_length holds the present longest length of matching tags or values. At line 14, the index is updated to the longest of i or index. Index will ultimately represent the length of S1 which is the number of columns [i]. If the condition at lines 9 and 10 is not met, then the system updates the position in the cell, dp[i][j] to zero at line 15.

Referring to FIG. 28, at the first pass through lines 7 to 9, the system will compare the first value of S1, i.e. "1", with the first value of S2, i.e. "2". Since 1 is not equal to 2, the condition at line 9 is not met, and the system goes to the else statement at line 15 and sets the value of the cell at dp[1][1]=0, which is shown in table 275 at 277.

Then the for-loop at line 8 iterates to i=2 and dp[1][2]. The system checks at line 9 if the first value of S1, e.g. "1", is equal to the second value of S2, i.e. "2". Since 1 is not equal to 2, the condition at line 9 is not met, and the system goes to the else statement at line 15 and sets the value of the cell at dp[1][2]=0.

Then the for-loop at line 8 iterates to dp[1][3]. The system checks at line 9 if the first value of S1, e.g. "1", is equal to the third value of S2, i.e. "1". Since 1 is equal to 1, the condition at line 9 is met and the system proceeds to line 11. At line 11, the system takes the value of the upper left diagonally adjacent cell, e.g. dp[0][2], and adds 1 to it and saves it to the cell, e.g. dp[1][3]. However, since the cell dp[0][2] does not exist the system treats is value as 0, therefore 0+1=1 and dp[1][3]=1. At lines 12 and 13 the repeated_region_length is updated to 1 because repeated_region_length is 0 and dp[1][3] is 1. The index is updated to 1 at line 14.

Then the for-loop at line 8 iterates to dp[1][4]. The system checks, at line 9, if the first value of S1, e.g. "1", is equal to the fourth value of S2, i.e. "2". Since 1 is not equal to 2, the condition at line 9 is not met, and the system goes to the else statement at line 15 and sets of the value of the cell at dp[1][4]=0.

Then the for-loop at line 8 iterates to dp[1][5]. The system checks, at line 9, if first value of S1, e.g. "1", is equal to the fifth value of S2, i.e. "1". Since 1 is equal to 1, the condition at line 9 is met and the system proceeds to line 11. At line 11, the system takes the value of the upper left diagonally adjacent cell, e.g. dp[0][4], and adds 1 to it and saves it to the cell, e.g. dp[1][5]. However, since the cell dp[0][4] does not exist the system treats is value as 0, therefore 0+1=1 and dp[1][5]=1. At lines 12 and 13 the repeated_region_length is updated to 1 because repeated_region_length is 0 and dp[1][5] is 1. The index is not updated at line 14 because repeated_region_length=1 is not less than dp[i][j]=1.

Then the for-loop at line 8 iterates to dp[1][6]. The system checks, at line 9, if the first value of S1, e.g. "1", is equal to the sixth value of S2, i.e. "2". Since 1 is not equal to 2, the condition at line 9 is not met, and the system goes to the else statement at line 15 and sets the value of the cell at dp[1][6]=0.

The for-loop of line 8 exits because to increment j to 7 would exceed the value of region_length, which is 6. Therefore, the for-loop of line 8 exits back to the for-loop of line 7, where the value of i is incremented to i+1, and, in this step, i=2, the value of j is reset to 1, therefore, dp[2][1]. The function will consider matches between the second value of S1 and the values of S2, in like manner as described above regarding the first value of S1. The column 2 of table 275 shows the values that result from comparing the second value of S1 to each of the values of S2 according to the for-loop function of lines 8 to 15.

Similarly, column 3 of the table 275 shows the values that result from comparing the third value of S1 to each of the values of S2 according to the for-loop function of lines 8 to 15, iterating from dp[3][1] to dp [3][6].

Further, column 4 of the table 275 shows the values that result from comparing the fourth value of S1 to each of the values of S2 according to the for-loop function of lines 8 to 15, iterating from dp [4][1] to dp[4][6]. At the iteration dp [4][4] of for-loop of line 8, the system will find that the 2 value of S1 at position four matches the 2 value of S2 at position four, so that the condition of line 9 is satisfied. Then at line 11, the system will set dp[i][j]=dp[i−1][j−1]+1 or dp[4][4]=dp[3][3]+1. Dp[3][3] is the upper left immediately adjacent cell from dp [4][4]. In this case, dp[3][3] has a value of 1. Therefore, dp[4][4]=dp[3][3]+1=1+1=2. At line 12, repeated_region_length=1 is less than dp[4][4]=2, therefore repeated_region_length is set to 2.

Further, column 5 of the table 275 shows the values that result from comparing the fifth value of S1 to each of the values of S2 according to the for-loop function of lines 8 to 15, iterating from dp[5][1] to dp[5][6]. At the iteration dp[5][5] of for-loop of line 8, the system will find that the 1 value of S1 at position five matches the 1 value of S2 at position five, so that the condition of line 9 is satisfied. Then at line 11, the system will set dp[i][j]=dp[i−1][j−1]+1 or dp[5][5]=dp[4][4]+1. Dp[4][4] is the upper left immediately adjacent cell from dp[5][5]. In this case, dp[4][4] has a value of 2. Therefore, dp[5][5]=dp[4][4]+1=2+1=3. At line 12, repeated_region_length=2 is less than dp[5][5]=3, therefore repeated_region_length is set to 3.

Further, column 6 of the table 275 shows the values that result from comparing the sixth value of S1 to each of the values of S2 according to the for-loop function of lines 8 to 15, iterating from dp[6][1] to dp[6][6]. At the iteration dp[6][6] of for-loop of line 8, the system will find that the 2 value of S1 at position six matches the 2 value of S2 at position six, so that the condition of line 9 is satisfied. Then at line 11, the system will set dp[i][j]=dp[i−1][j−1]+1 or dp[6][6]=dp[5][5]+1. Dp[5][5] is the upper left immediately adjacent cell from dp[6][6]. In this case, dp[5][5] has a value of 3. Therefore, dp[6][6]=dp[5][5]+1=3+1=4.

At line 12, repeated_region_length=3 is less than dp[6][6]=4, therefore repeated_region_length is set to 4.

After considering dp[6][6], the for-loop at line 8 and the for-loop at line 7 will each exit because iterating to 7 will exceed the region_length of 6.

At line 16, the system checks if there are any matches. It does so by checking if repeated_region_length is greater than 0. In this case, repeated_region_length is 4 so the condition of line 16 is satisfied. At line 17, the function assembles the tokens or tags of the repeated region. Index=6 and repeated_region_length=4. Therefore range (index−repeated_region_length) to index is the range of 2 to 6. The positions of the string S1 and S1 from 2 to 6 are the longest matching common string, i.e. 1, 2, 1, 2, as shown in the table 275. The highest value in the table is 4. Proceeding up and to the left in the table the sequence of values 4, 3, 2, 1 is found for the positions dp[6][6], dp[5][5], dp[4][4], dp[3] [3], respectively. Therefore, at lines 17 and 18 the repeated region=1, 2, 1, 2.

Then at line 20, the function finds all occurrences of the repeated sequence/region, e.g. 1, 2, 1, 2, in the extraction page. And for each instance of the repeated sequence, 1, 2, 1, 2, the function obtains the start and end position index of the instance of the repeated sequence. Then the system calls at line 22 the Adjacent Variant Extractor function to determine whether a given instance of the repeated region in the extraction page matches identifying attributes from within the source region of the template page. The Adjacent Variant Extractor function is shown at lines 23 to 25. At line 24 and 25 if the contents and/or attributes of region bound by the start index and end index of the extraction page matches the instances of that of the sought region from the template page, then at line 25, the function will return/identify the start index and end index of the html region of the extraction page as containing the sought element. The Adjacent Variant Extractor function is further explained above regarding step 294 of FIG. 21.

Figure 22:
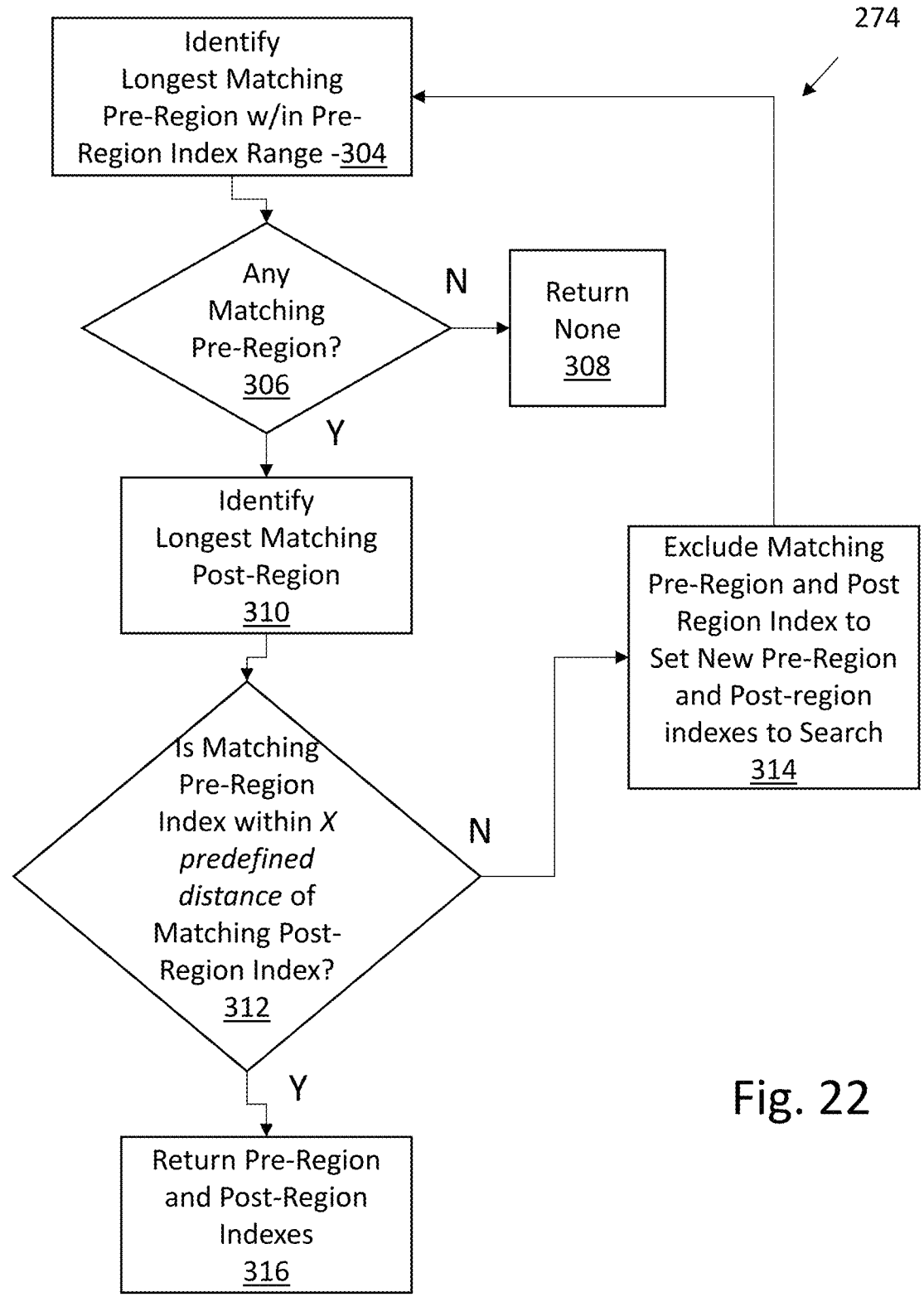
FIG. 22 is a flow diagram of a record extractor function of the lazy learning based element rediscovery function.

An exemplary flow diagram for one embodiment of the record extractor function 274 is shown in FIG. 22. The function considers the pre-region as the region before the index of the annotated element from the template page and the post-region as the region after the index of the annotated element from the template page. Therefore if the annotated element is tag 160, then the pre region is the region before tag 160. Tag 160 has an index of 44, therefore, the initial pre-region index range would be 0 to 43 and the initial post-region index range would be 45 to 62 of the template page. The pre-region of the extraction page would be 0 to 43 and the post region of the extraction page would be 45 to the last index of the extraction page.

In some embodiments, the initial pre-region and the initial post-region is less than the entire area of the webpage before annotated element and the entire area of the webpage after the annotated element, respectively. In some embodiments, when the repeated data extractor and/or adjacent variant extractor identifies an index or index range having the sought element, that index or index range is passed to the record extractor. In that case the beginning of the passed index range to the element before the annotated element is the pre-region and the element immediately after the annotated element to the end of the passed index range is the post-region.

At step 304 the function attempts to identify the longest matching sequence in a pre-region of the extraction page that matches a sequence within the pre-region of the template page.

In some embodiments, the function compares the sequences of types of tags between the pre-region of the template page and the pre-region of the extraction page. For example, the type sequences shown in FIG. 18A-18B or the type sequences shown in FIGS. 16-17. These type sequences may include open (1), close (2), and tags that do not have a close tag by default (3).

FIG. 23 shows a series of type sequences for illustration purposes. The template row shows the sequence 1 1 1 2 2 1 1 2 2 2, each corresponding to a tag type (1 for open, 2 for close) from an example template page. FIG. 23 shows an index row providing an index encoding for each of the tags. Therefore, the template page has 10 tags shown from index 0 to 9. For the sake of example, assume that index 6 corresponds to the annotated element from the template page. The rows beginning with Ex1, Ex2, Ex3, and Ex4 are each example extraction pages, wherein the record extractor function 274 should attempt to find the annotated element.

If Ex 1 is the extraction page, at step 304, the record extractor will look at the tag types of indexes 5 through 0. In some embodiments, the record extractor considers the pre-region tag types in reverse order, e.g. from index 5 to 0 rather than from 0 to 5. This may be done as it can be more likely that the sought element is closer to the middle of the page than the beginning of the page. The record extractor will compare the tag types of indexes 5 through 0 of the template page to the corresponding tag type of indexes 5 through 0 of the extraction page Ex 1. In the case of extraction page Ex 1, the longest matching sequence in reverse order if is 1, 2, 2, 1, 1, 1. In the case of extraction page Ex 1 all of the tag types from index 5 to 0 match all of the corresponding tag types of the template page from index 5 to 0, in order. At step 304 the record extractor will set the pre-region match index to the beginning pre-region sequence in the extraction page Ex1. When the pre-region is considered in the reverse order, the beginning of the reverse order pre-region match will actually be the end of the pre-region match in the normal order. Therefore, the pre-region match index will be set to 5 in the example of extraction page Ex 1.

At step 306, the record extractor will check if any matching sequences of tag types were found in the pre-region. If no matching sequences of tag types were found in the pre-region, then the extractor function quits and return a value indicating a match could not be found by the lazy learning based element rediscovery function 30 at step 308. If matches were found then the record extractor will proceed to step 310.

At step 310, the record extractor function compares the sequences of types of tags between the post-region of the template page and the post-region of the extraction page. In the case of the template page of FIG. 23, the post region is from index 6 to the end index, which is 9. The extractor function compares the sequences of tag types of the post-region of the template page to the sequences of tag types of the post region of the extraction page Ex 1. In the case of extraction page Ex 1, all of the tag types from index 7 to 9 match all of the corresponding tag types of the template page from index 7 to 9, in order. At step 310 the record extractor will set the post-region match index to the beginning post-region sequence in the extraction page Ex1. Therefore, the post-region match index will be set to 7 in the example of extraction page Ex 1.

At step 312, the record extractor will check whether the matched pre-region, identified at step 304, is within a predefined distance from the matched post-region, identified at step 310. If the matched pre-region is close enough to the matched post region, when it is likely that the target/sought element can be identified between the matched pre-region and the matched post region. In some embodiments, the predefined distance is less than or equal to 2 indexes. In some embodiments, the predefined distance is less than or equal to 1 index.

In the Ex 1 the pre-region match index is 5 and the post-region match index is 7. The record extractor will calculate the distance by subtracting the post-region match index from the pre-region match index. In the case of Ex 1 the distance is 7−5=2. Therefore where the predefined distance X is 2, then at step 312, for Ex 1, the exit condition is satisfied, the Extractor function will proceed to step 316 and return the pre-region match index and the post-region match index. The extractor function has identified the element of index 6, which is between the element of index 5 and the element of index 7 as the probable target or sought element.

In some embodiments, the extractor function calculates and returns a match score along with the pre-region match index and the post-region match index. In some embodiments, the match score is the summation of a pre-region match score and a post-region match score. The pre-region match score can be calculated at step 304 or at another point such as at or before the return of step 316. Likewise, the post-region match score can be calculated at step 310 or at another point, such as at or before the return of step 316.

The extractor function calculates the pre-region match score by counting or calculating the number of tag types that match in order in the pre-region. In the case of Ex 1, all the pre-region tag types match in order and the pre-region match score is 6. The extractor function calculates the post-region match score by counting or calculating the number of tag types that match in order in the post region. In the case of Ex 1, all of the post-region tag types match in order and the post region score is 3. The extractor function will then add the post-region match score to the pre-region match score to determine the total match score. In the case of Ex 1, the total match score is 9.

In some embodiments, the extractor function or another function can calculate or present the match score as a percentage of the total number of indexes in the template page or in the pre-region and post-region. In the case of Ex 1, the total match score is 9, the total number of index tag type tokens is 10. Therefore, the system can calculate the score as a percentage $9/10=90\%$. However, in some embodiments, 1 is subtracted from the total number of indexes before dividing it by the total number of index tag type token, e.g. $(9)/(10-1)=1=100\%$. This can be done to account for the exclusion of the annotated element from the pre-region and post-region. In the case of Ex 1 all of the tags of the pre-region and post-region match, so subtracting 1 result in a percentage representation of a total pre-region and post-region match.

Considering extraction page Ex 2, at step 304, the extractor function will find that the longest matching sequence in the pre-region, considered in reverse, is from index 5 to 2, to with sequence 1, 2, 2, 1. Since value at index 1 in Ex 2 is different from the value at index 1 of the template page, the matching sequence terminates at index 2. The extractor function set the pre-region match index to 5. At step 310 the extractor function will find the longest matching sequence in the post-region extending from index 7 to index 8. Since the value at index 9 in Ex 2 is different from the value at index 9 of the template page, the matching sequence terminates at index 8. The extractor function sets the post-region match index to 7. At step 312, if the pre-defined distance is equal or less than 2, then the condition is met where 7−5=2. The extractor proceeds to step 316 and returns the post-region match index and the pre-region match index.

The extractor may also calculate the match score and return the match score at step 316. In the case of extraction page Ex 2, the pre-region match score is 4 and post region match score is 2, and the total match score is 6. The percentage match score, as a percentage of the total pre-region indexes and post region indexes is $6/9=2/3\approx 66.6667$ percent.

Considering extraction page Ex 3, at step 304, the extractor function will find that the longest matching sequence in the pre-region, considered in reverse, is from index 5 to 3, to with sequence 2, 2, 1. This sequence matches the sequence of 2, 2, 1 at indexes 4 to 2. The extractor function sets the pre-region match index to 5, the beginning (in reverse order) of the matching sequence in the extraction page Ex 3. At step 310 the extractor function will find the longest matching sequence in the post-region extending from index 7 to index 8. Since the value at index 9 in Ex 2 is different from the value at index 9 of the template page, the matching sequence terminates at index 8. The extractor function sets the post-region match index to 7. At step 312, if the pre-defined distance is equal or less than 2, then the condition is met where 7−5=2. The record extractor proceeds to step 316 and returns the post-region match index and the pre-region match index.

The extractor may also calculate the match score and return the match score at step 316. In the case of extraction page Ex 3, the pre-region match score is 3 and post region match score is 2, and the total match score is 5. The percentage match score, as a percentage of the total pre-region indexes and post region indexes is $5/9\approx 55.556$ percent.

Considering extraction page Ex 4, at step 304, the extractor function will find that the longest matching sequence in the pre-region, considered in reverse, is from index 2 to 0, with sequence 1, 1, 1. The extractor function sets the pre-region match index to 2, the beginning (in reverse order) of the matching sequence in the extraction page Ex 4. At step 310 the extractor function will find the longest matching sequence in the post-region extending from index 7 to index 8. The extractor function sets the post-region match index to 7. At step 312, if the pre-defined distance is equal or less than 2, then the condition is not met where 7−2 is 5, which is not less than or equal to 2. The record extractor proceeds to step 314 and set the pre-region for consideration to exclude the region of the prior match at index 2 to 0. Therefore, the new pre-region for consideration is from index 5 to 3. The record extractor uses this new index range at step 304 to find the longest match within that range. The longest matching sequence within the range of index 5 to 3 of extraction page Ex 4 is from index 5 to 4. This sequence matches the corresponding sequence of the template page.

At step 310, the extractor function may skip checking of the longest matching sequence if the previous post-region match index is within 1 index of the annotated element, which in this case is index 6. In another embodiment, the extractor function may re-run the step 310 on the original post-region index range to obtain the result explained above where the longest matching sequence in the post-region extending from index 7 to index 8. The extractor function sets or maintains the post-region match index to 7.

At step 312, if the pre-defined distance is equal or less than 2, then the condition is met where 7−5=2. The record extractor proceeds to step 316 and returns the post-region match index and the pre-region match index.

The record extractor function may also calculate the match score and return the match score at step 316. In the case of extraction page Ex 4, the pre-region match score is 2 and post region match score is 2, and the total match score is 4. In some embodiments, the pre region match score and post region match score may be calculated to include all matching indexes not only the most recent matching indexes. In the case of Ex 2, such a calculation of the pre-region match score would be 3 (first match at indexes 2 to 0)+2 (second match at indexes 5 to 4)=5.

The record extractor will identified the sought element as between the returned pre-region index and the returned post-region index. For example, in the case of the examples of FIG. 23, the sought element is at index 6.

After the record extractor identifies the sought element index between returned pre-region index and the returned post-region index, the returned pre-region index and the returned post-region index will be passed to the basic extractor function 264 along with the data type of the original missing web element locator. For example, if the original web element locator is the value of the class attribute of button tag 160, then the basic extractor function would be passed the "class" as the type along with the index or indices returned by the record extractor. Then as explained above, the basic extractor function would return the value of the "class" attribute for the web element at the index or indices provided. Assuming that the value of the class attribute for button tag was changed to login101-form-bth rather than login100-form-btn as shown in FIG. 10, then the basic extractor function 264 would return login101-form-btn for the class attribute of the element specified by the index or indices returned by the record extractor, in the case of tag 160, the index would be 44 or the index range would be 43 to 45 where 44 is between those indices.

At step 31, the system 24 will return the sought element at step 27. Returning the sought element may include returning the index of the sought element, returning the updated web element locator, such as login101-form-bth rather than login100-form-btn in the example above, and or returning the tag, such as tag 160 <button class="login101-form-btn"> Login</button> or a portion thereof. The system 24 may also return to the user the match score calculated by the record extractor based on the sum of matches in the pre-region and post-region. The system may indicate the changed element, such as the change of <button class="login100-form-bth"> to <button class="login101-form-btn">. The return of some or all of this information, may optionally be provided to a user or to a queue for the user to review the information at step 20. At step 22, the system updates the web element locator to account for the changed web element locator so that testing may resume. For example, if the original locator was class="login100-form-btn" of the button tag 160 the updated locator could be the class value of "login100-form-btn".

Figure 24:
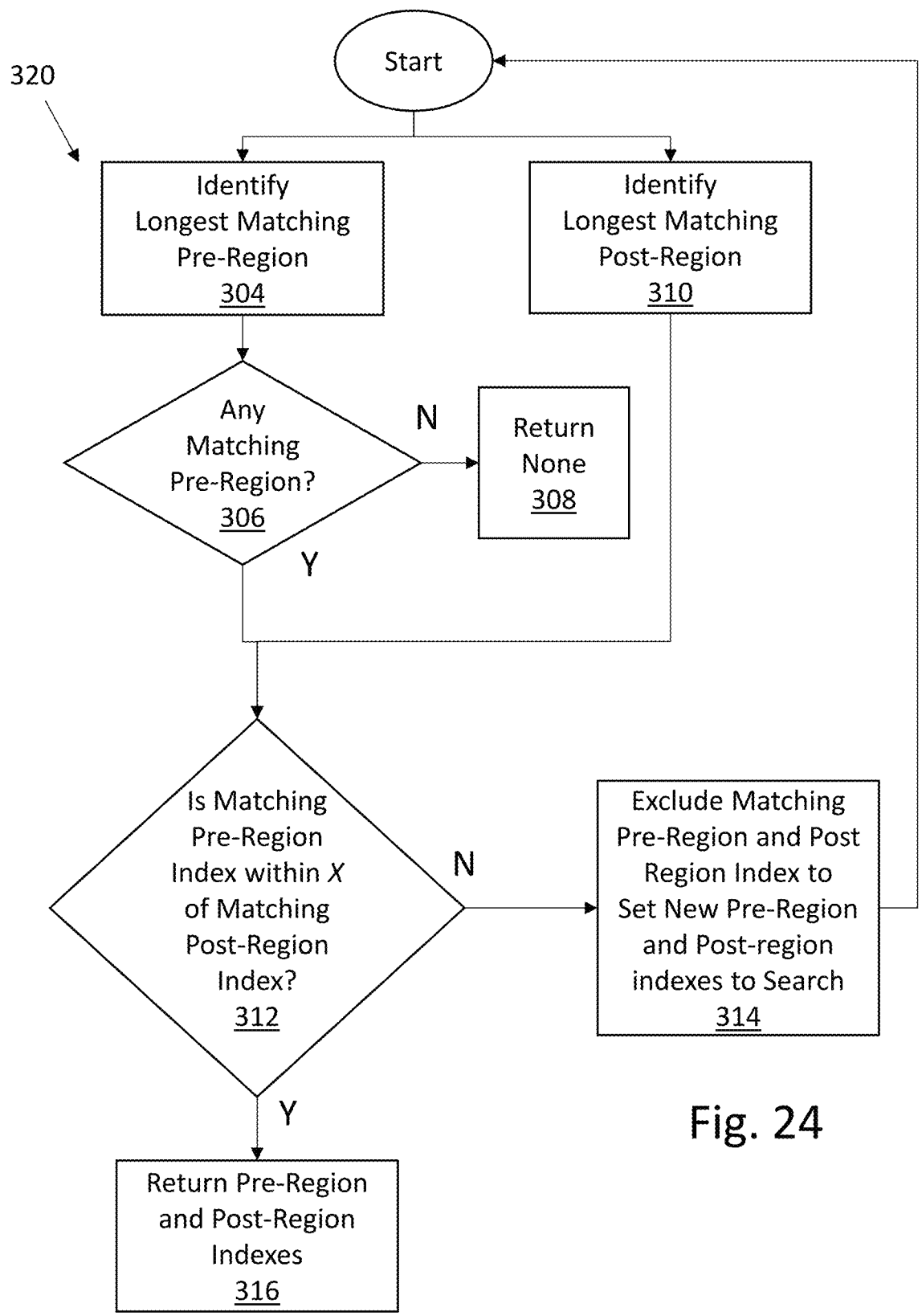
FIG. 24 is a flow diagram of a second embodiment record extractor function of the lazy learning based element rediscovery function.

FIG. 24 shows a second embodiment record extractor function 320, which is the same as record extractor function 274 except that the identify longest matching pre-region step 304 is performed in parallel with the identify longest matching post-region step 310. These two steps are independent therefore they can be performed in parallel or in any order relative to each other.

Figure 25:
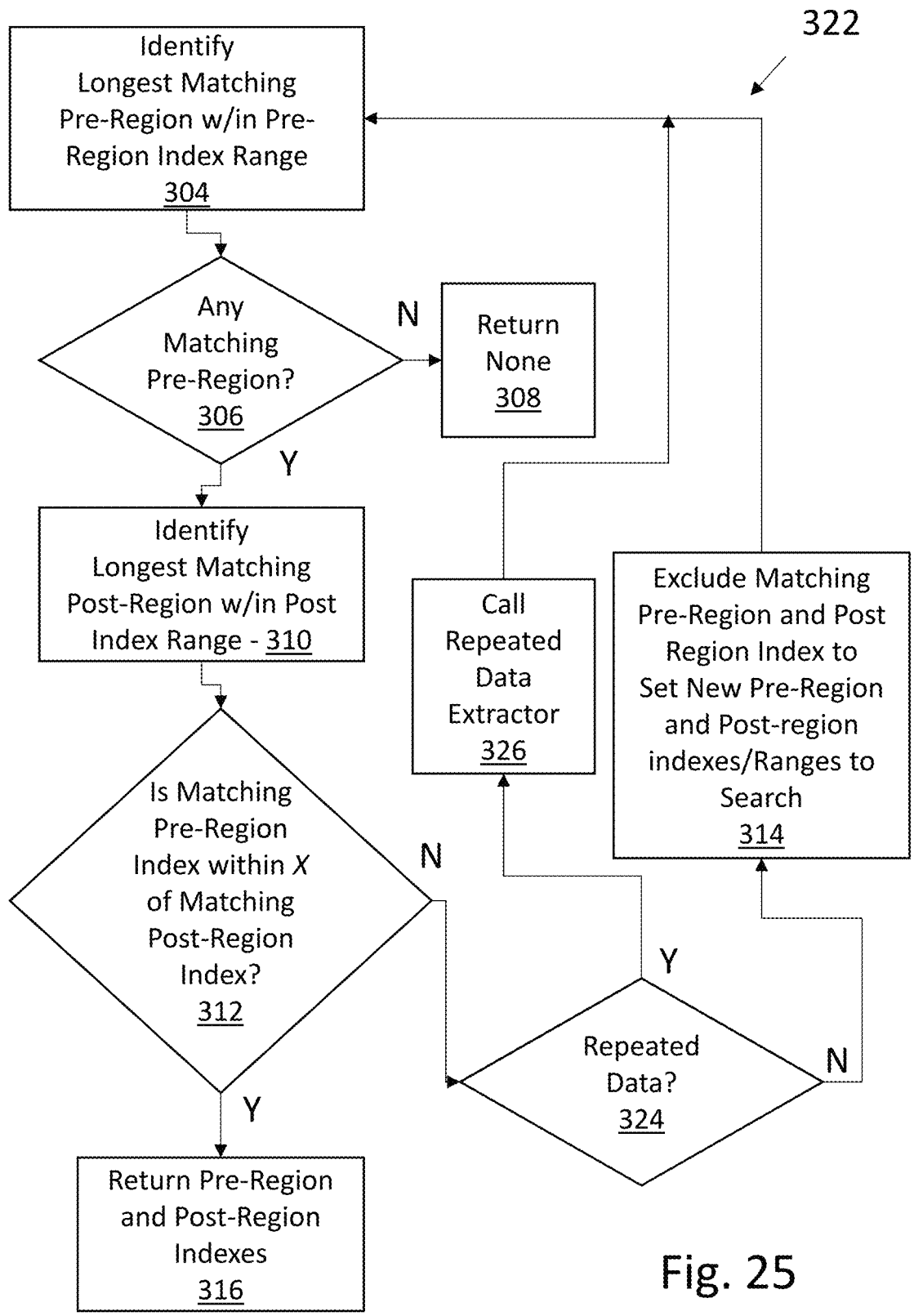
FIG. 25 is a flow diagram of a third embodiment record extractor function of the lazy learning based element rediscovery function.
Figure 26:
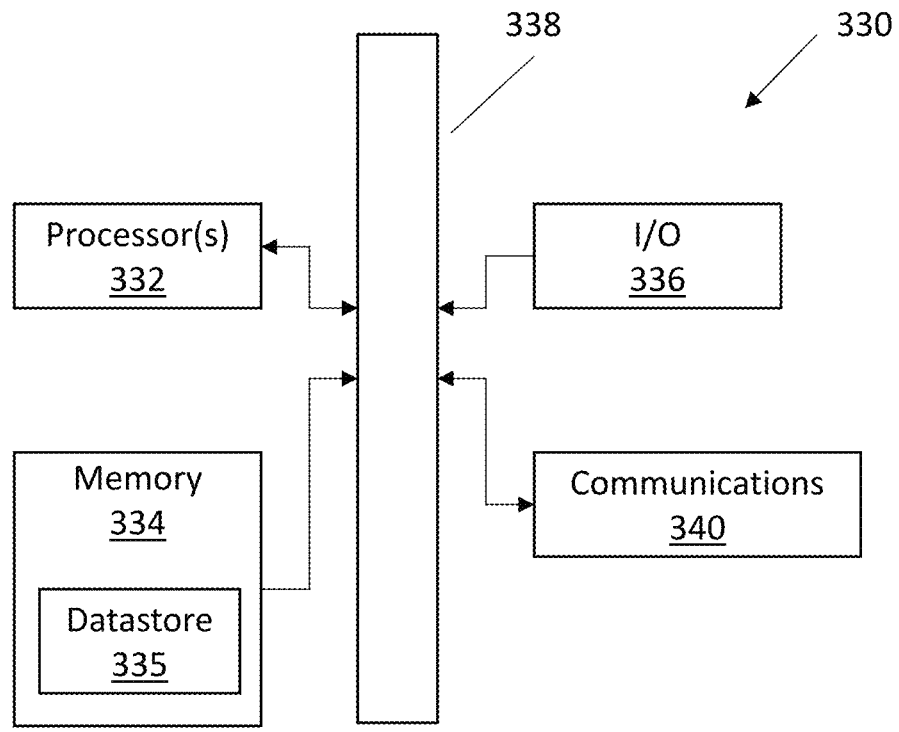
FIG. 26 is a block diagram of an exemplary computing device architecture capable of hosting the web element rediscovery system.
Figure 27:
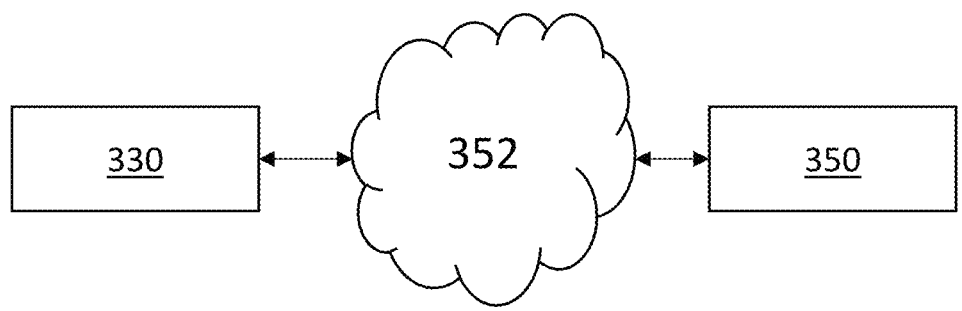
FIG. 27 is a block diagram of exemplary communications paths between computing devices.

FIG. 25 shows a third embodiment record extractor function 322, which is similar to the record extractor function 274 except that it optionally includes a call to repeated data extractor(s) if the subject pre-region index range or post-region index range includes repeated subtrees, as discussed in connection with the repeated data extractor function 270 and the adjacent variable extractor function 272 above. The repeated data extractor function or the adjacent variable extractor function will set the new pre-region and post-region indexes/ranges to search according to their function explained above, which should identify the particular branch or portion of the repeated subtree(s) that is likely or does contain the sought element. Then at steps 304, 310, and 312, the extractor function will attempt to find the identified pre-region and post-region indexes to the point where the pre-region and post-region indexes are within the pre-defined X condition, such as 2, where the sought element will be located there between. The loop at step 312 to 324 will continue until the pre-region and post-region indexes are within the pre-defined X condition or until there is no matching pre-region at stop 306.

In some embodiments, the record extractor function, including certain sub-functions, can be represented in the following pseudocode:

```
1.  record_extractor (extraction_tokens, template_tokens, annotation_tag,
repeated_flag, start_index, end_index)
2.     start_index = start_index
3.     if end_index is none:
4.         end_index = len(extraction_tokens)
5.     match_score, preregion_index, postregion_index =
find_matching_region(extraction_tokens, template_tokens, start_index, end_index,
annotation_tag)
6.     if (preregion_index – postregion_index) <= 2:
7.         return match_score, preregion_index, postregion index
8.     else if repeated_flag:
9.         if preregion_index >= subtree_start_index and postregion_index <=
subtree_end_index:
10.            call repeated data extractor and adjacent variant extractor
11.    else:
12.        start_index = preregion_index
13.        end_index = postregion_index
14.        record_extractor(extraction_tokens, template_tokens, annotation_tag,
repeated_flag, start_index, end_index)
15. find_matching_region(extraction_tokens, template_tokens, range_start,
range_end, annotation_tag)
16.    data_length = len(extraction_tokens)
17.    reverse_preregion = template_tokens from first index of annotation tag to
start_index
18.    reverse_extraction_tokens = extraction_tokens from last to first
19.    preregion_reverse_index, preregion_match_score =
find_longest_unique_matching_sequence(reverse_extraction_tokens,
reverse_preregion, data_length-range_end, data_length-range_start)
20.    if no preregion_reverse_index:
21.        return 0, none, none
22.    preregion_index = len(extraction_tokens) – preregion_reverse_index – 1
23.    postregion = template_tokens from last index of annotation tag to end_index
24.    postregion_index, postregion_match_score =
find_longest_unique_matching_sequence(extraction_tokens, postregion,
preregion_index+1, range_end)
25.    if no postregion_index:
26.        return 0, none, none
27.    match_score = preregion_match_score + postregion_match_score
28.    return match_score, preregion_index, postregion_index
29. find_longest_unique_matching_sequence(sequence_to_search, subsequence,
range_start, range_end)
```

```
30.   matches = find_naive_match(sequece_to_search, subsequence, range_start, range_end)
31.   return index,match_score of the item with highest match score
32.   if no matches:
33.      return none, none
34. find_naive_match(sequence_to_search, subsequence, range_start, range_end)
35.   start_val = subsequence[0]
36.   for i from range_start to range_end:
37.      if start_val = sequence_to_search[i]:
38.         match_score = find_common_subsequence(sequence_to_search(i to end), subsequence)
39.   return list of all (i, match_score) tuples
40. find_common_subsequence(sequence_to_search, subsequence)
41.   i = 0
42.   create a list of tuples containing pairs of values from sequence_to_search and subsequence
43.   For i, each item in the list:
44.      if the first value in the tuple does not match the second value:
45.         Return i
46.      else: i = i +1;
47.   return i.
```

At line 1 of the forgoing record extractor function pseudo-code, the extractor function receives, the tokens/tags from the extraction page, the tokens/tags of the template page, the annotated tag from the template page, a repeated flag (in the case of repeated data present), a start index, and an end index. The start index and end index define the region of the extraction page where the record extractor function will operate. The token/tags can be represented as type-coded tags, for example, having values in the range of 0 to 2 for open, close, and tags that don't have a closes tag by default.

At line 2, the start index is set to the start index received by the function. At lines 3 and 4, if there is no end index provided to the function, the function will set the end index to the length of the extraction page tokens. The tokens are the tags. For example, in the case of the tags of FIG. 17, there are 62 tags. Therefore, if the extraction page has 62 tags after processing, then the length would be 62 and the end index would be set to the last position index of the extraction page. The tags can be an encoded tag value, e.g. 1, 2, or 3.

At line 5, the match score, a preregion index, and a post region index are set according to the subfunction find_matching_region. The find_matching_region function is provided at line 15. The find matching region function receives as inputs or uses as inputs extraction_page tokens/tags, template page_tokens/tags, the start_index, the end_index, and the annotated tag from the template page.

At line 16 of the find match region function, the data length variable is set to the length of the extraction page tokens from the start index to the end index passed to the function at line 5. At line 17, a reverse preregion of the template page is created by reversing the order of the template tags from first index of adjacent to the annotation tag to start_index. At line 18, a reverse order of the extraction page tokes/tags is created.

At line 19 the variables preregion_reverse_index, and preregion_match_score are set according to subfunction find_longest_unique_matching_sequence. Subfunction find_longest_unique_matching_sequence is defined at line 29.

The find_longest_unique_matching_sequence function receives as input or accesses the following: reverse_extraction_tokens, the reverse_preregion, the data_length-range_end, and the data_length-range_start. At line 30, the find longest unique matching sequence function calls the find naive match function, which returns matches, which are saved in the matches variable.

The find_naive_match function at line 34 receives the sequece_to_search, the subsequence to search for in the sequece_to_search, the range_start index, the range_end index. At line 35, the function sets the start_val to the value of the first position, position 0, of the subsequence. Then at line 36 to 38, the function uses a for-loop to search the from the range start to the range end. If start_val=sequence_to_search[i], then the first value of the subsequence matches the value of position i of sequence_to_search or sequence_to_search[i]. If there is a first position match, then the find_common_subsequence subfunction is called to determine match_score, which is received at line 38.

The find_common_subsequence function is shown at line 40. The find_common_subsequence receives the sequence_to_search(from i to end) and the subsequence to search for. The find_common_subsequence function counts the number of matching tags that follow from the first matching tags found at line 37. The counted number of matching tags is the match score returned at line 38. In some embodiments, the find_common_subsequence function creates a list of tuples containing pairs of values from sequence_to_search and subsequence. The list of tuples could be in the form of (value from sequence_to_search, value from subsequence). If the sequence_to_search is 1 2 1 2 1 1 1 and the subsequence to search for is 1 2 1 2, the list of tuples would be in the form of (value from sequence_to_search, value from subsequence), such as the list (1, 1), (2, 2), (1, 1), (2, 2), (1,), (1,), (1,). In this example, the for-loop at line 43 will increment i=i+1 at line 46 for the first through fourth tuples, because the condition of line 44 of a mismatch is not met, and therefore the else statement of 46 is executed. When the for-loop at line 43 increments to i=5, then the condition at line 44 will be true because the subsequence does not have a value that matches or corresponds to the position 5 of the sequence_to_search, as shown by the one sided tuple (1,). Therefore, at line 45 the function will return i as the match score. In this case i=4 since there are 4 matches, which results in the incrementing at line 46 of i four times. If the subsequence completely matches the sequence_to_search, then at line 47 the function will return i+1.

The returned value from find_common_subsequence will be saved at line 38 to the match_score variable corresponding to the start position i of the sequence_to_search, i.e. sequence_to_search[i]. The function will create a list of tuples containing the start position i of the sequence_to_search and corresponding match score for that position as determined by the find_common_subsequence function. Therefore, before iterating to the next i position after line 38 in the for-loop of line 36, the system will save the match score, start position tuple.

Then at line 26, the system will iterate i to the next value, e.g. from 0 to 1, and the steps of line 37 and 38 will be repeated to determine if there is a match of the subsequence beginning at that position of i in the sequence_to_search, e.g. sequence_to_search[i]. If there is a match of the first values, then at line 38 the find_common_subsequence function will score the match by counting the number of matching values between sequence_to_search[i] and the end of subsequence.

The for-loop of line 26 will continue iterate i from range_start to range_end checking for matches and calculating the match score for each position of a match in the sequence_to_search.

At line 39, the find_naive_match function will return the list of the list tuples containing the pair of (the start position i of the sequence_to_search, and the corresponding match score for that i position). Those tuples are received into the matches variable at line 30. At line 31, the find_longest_unique_matching_sequence function finds the tuple in the matches list of tuples that has the highest score value, and returns that match score and corresponding the index location of the beginning of that match. At line 32 if there are no matches, the function returns none for the match score and none for the index location.

At line 19, the find_matching_region receives the index and match score from the find_longest_unique_matching_sequence and saves those as preregion_reverse_index and preregion_match_score, respectively.

At lines 20 and 21 if no matches were found in the pre-region, then that information, as return 0, none, none, is returned at line 21 and saved at line 5 into the match_score, preregion_index, and postregion_index, respectively.

At line 22, the function finds the actual preregion index based on the revers e_preregion_index returned by the find_longest_unique_matching_sequence function. This is done by reversing the reverse_preregion_index as is shown by the following of line 22 preregion_index=len(extraction_tokens)−preregion_reverse_index−1.

At line 23, the post-region is populated with the tokens/tags from the index immediately adjacent (toward the end) to the annotation tagged index to the end index.

At line 24, the function again calls the find_longest_unique_matching_sequence, as it did at line 19. But for line 24, the data passed to the find_longest_unique_matching_sequence function corresponds to the post region after the index of the annotated tag. The function receives the following data: extraction_tokens/tags from the extraction page, postregion of the extraction page, the first index after the pre-region (e.g. preregion_index+1), and the range_end. The find_longest_unique_matching_sequence function will operate the same as described above, but with different data from the post region. In doing so, it will identify the longest match segment in the post region. The index of the beginning of the longest matching segment and the match score of the longest match segment in the post region will be saved at line 24.

At line 25 and 26 if no matching segment was found in the post region, then this information is returned, as 0, none, none, to the corresponding variables of line 5.

If there was a match in the pre-region and a match in the post region, then at line 27 a total match score is calculated by adding the match score of the preregion and a match score of the postregion. At line 28, the find_matching_region function returns the (total) match_score, preregion_index, and the postregion_index to the corresponding variables at line 5.

At line 6, the record extractor function checks, if the preregion_index returned is close enough to the postregion_index returned, such as less than or equal to 2, such as explained at step 312 of FIG. 22. If the condition of line 6 is satisfied, then the record extractor returns the match_score, preregion_index, and postregion index.

If the condition of line 6 is not satisfied, then in some embodiments, the record extractor checks at line 8 if there is repeated data as indicated by the value of the repeated_flag. If there is repeated data, then at line 10, the repeated data extractor function and adjacent variant extractor function can be called. In some embodiments, lines 8 through 10 are not included and the repeated data extractor function and adjacent variant extractor function are called before the record extractor function is called.

Further if the condition of line 6 is not met, and in some embodiments, the condition of line 8 (the presence of repeated data) is not met, then at line 12 and 13, the start index and end index is set to exclude the previously matching pre-region and post-region, such as described at step 314 of FIG. 22. Then the record_extractor function reclusively calls itself at line 14 with the new start index and the new end index excluding the previously matching pre-region and matching post-region. Therefore, the record extractor function may recursively call itself until the exit condition of line 6 is satisfied.

The steps, functions, processes, and capabilities described herein can be provided in the form of instructions stored in a computer readable medium and executable by a processor of a computing device to achieve the corresponding functions, processes, capabilities, or results. The functions, steps, processes, and routines described herein can be carried out on or by one or more computing devices, such as computing device 330. The computing device 330 may be a computer server or other computing device. An example computing device 330 comprises a processor(s) 332, a memory 334, and input and/or output device 336. The processor is connected to the memory though one or more communication channels 338, such as communication bus. The input and/or output device(s) 336 is connected to the processor and or memory through one or more communication channels 338. The output device may comprise a display. The input device may comprise a keyboard, mouse, and/or touch screen. In some embodiments, the device 330 has a network communication device 340 for communication with one or more other computing devices, including across one or more networks 352, such as the Internet.

Other computing device architectures are also possible. Further, the computing device may be located remotely from the user. The computing device may be a remote computing service, such as a cloud computing service or cloud hosted server(s), capable of storing and executing instructions for carrying out the functions, steps, processes, and routines described herein. In some embodiments, the computing device 330 computers multiple computers.

The memory comprises instructions, which can be executed by the processor for carrying out the functions, steps, processes, and routines described herein, including those described in connection with the searching function 10 and the web element rediscovery system 24 and the functions, steps, processes, and routines thereof. The memory may comprise network communication instructions for communicating with other devices, including computing devices, and including across one or more networks. The memory may comprise operating system instruction for carrying out basic computer operation tasks, such as data access, transfer, calculation, and communication functions among others. The memory may comprise web browser instructions for carrying out web browsing functions. The memory may comprise web server instruction for carrying out web server functions, including serving webpages to requesting web browsers and remote clients. The memory can store the data considered, stored, and used by the functions, steps, processes, and routines described herein, such as the web element knowledge datastore 46, and the crawler knowledge datastore 100. The memory may comprise one or more computer readable mediums, such as random access memory (RAM), read only member (ROM), solid state memory, non-volatile storage, volatile storage, and/or other storage.

A user may access the computing device 330 from a remote client device 350 and/or may submit user interfaces, webpages, and/or web application to the computing device 330 for testing and/or for web element rediscovery. The client device 350 may have the same architecture as the computing device 330 or may have more or less components. The client device 350 may communicate with the computing device 330 across one or more networks, such as networks 352.

From the foregoing, it will be observed that numerous variations and modifications may be affected without departing from the spirit and scope of the invention. It is to be understood that no limitation with respect to the specific apparatus illustrated herein is intended or should be inferred. For example, one or more component embodiments may be combined, modified, removed, or supplemented to form further embodiments within the scope of the invention. As a further example, steps provided in the flow diagrams of the figures, could be carried out in a different order to achieve desired results. Further, steps could be added or removed from the processes described. Therefore, other embodiments and implementations are within the scope of the invention.

The invention claimed is:

1. A computer implemented method of identifying a changed element within a target web page, comprising the step of:
   identifying within a pre-region of the target web page a pre-region longest matching segment of the pre-region that matches a pre-region segment of a pre-region of a source web page, where the target web page comprises at least one change as compared to the source web page, the pre-region of the source web page comprises an area of the source web page before an encoded position of a sought element in the source web page, the pre-region of the target web page comprises an area of the target web page before the encoded position in the target web page;
   identifying within a post-region of the target web page a post-region longest matching segment of the post-region that matches a post-region segment of a post-region of the source web page, where the post-region of the source web page comprises an area of the source web page after the encoded position, the post-region of the target web page comprises an area of the target web page after the encoded position in the target web page;
   determining the pre-region longest matching segment is within a pre-defined distance of the post-region longest matching segment;
   identifying the changed element in the target web page that is between the pre-region longest matching segment and the post-region longest matching segment in response to the pre-region longest matching segment being determined to be within the pre-defined distance of the post-region longest matching segment.

2. The method of claim 1, comprising the steps of:
   before the step of determining, determining the pre-region longest matching segment is not within the pre-defined distance of the post-region longest matching segment;
   in response to determining the pre-region longest matching segment is not within the pre-defined distance of the post-region longest matching segment,
      reducing a size of the pre-region of the source web page by excluding the pre-region longest matching segment from the pre-region of the source web page;
      reducing a size of the pre-region of the target web page by excluding the pre-region longest matching segment from the pre-region of the target web page;
      reducing the size of the post-region of the source web page by excluding the post-region longest matching segment from the post-region of the source web page;
      reducing the size of the post-region of the target web page by excluding the post-region longest matching segment from the post-region of the target web page;
   repeating at least the steps of:
      identifying within the pre-region of the target web page the pre-region longest matching segment; and,
      identifying within the post-region of the target web page the post-region longest matching segment.

3. The method of claim 1, wherein the step of determining comprises the step of proceeding, starting with the pre-region longest matching segment not within the pre-defined distance of the post-region longest matching segment, to reduce a size of the pre-region of the source web page and of the pre-region of the target web page by excluding the pre-region longest matching segment from the pre-region of the source web page and the pre-region of the target web page and to reduce a size of the post-region of the source web page and a size of the post-region of the target web page by excluding the post-region longest matching segment from the post-region of the source web page and the post-region of the target web page, with the reduced pre-regions and the reduced post-regions acting as an initial value for a next iteration, until the pre-region longest matching segment is within the pre-defined distance of the post-region longest matching segment.

4. The method of claim 1, comprising the step of position encoding the source web page and position encoding the target web page, wherein the encoded position of the sought element in the source web page is an encoded position index of the sought element, the pre-region of the source web page is an area of the source web page before the encoded position index of the sought element in the source web page, the post-region of the source web page is an area of the source web page after the encoded position index, the pre-region of the target web page is an area of the target web page before the encoded position index, and the post-region of the target web page is an area of the target web page after the encoded position index.

5. The method of claim 1, comprising the step of type encoding the source web page and the target web page, and wherein
the pre-region longest matching segment is a pre-region longest matching segment of encoded values, and
the post-region longest matching segment is a longest matching segment of encoded values, and
the step of identifying within a pre-region of the target web page a pre-region longest matching segment is further defined in that the encoded values of the pre-region of the target web page are compared to the encoded values of the pre-region of the source web page to identify the pre-region longest matching segment of encoded values of the pre-region that matches a pre-region segment of encoded values of the pre-region of the source web page; and,
the step of identifying within a post-region of the target web page a post-region longest matching segment is further defined in that the encoded values of the post-region of the target web page are compared to the encoded values of the post-region of the source web page to identify a post-region longest matching segment of encoded values of the post-region of the target web page that matches a post-region segment of encoded values of the post-region of the source web page.

6. The method of claim 5, wherein the step of type encoding is further defined in that opening tags are assigned a first encoding value, closing tags are assigned a second encoded value, and tags which do not have a closing tag by default are assigned a third encoded value, and wherein the step of type encoding results in a sequence of encoded values for the source web page corresponding to a sequence of tags within the source web page, and a sequence of encoded values for the target web page corresponding to a sequence of tags within the target web page.

7. The method of claim 6, wherein the step of type encoding is further defined in that the target web page comprises HTML code and the source web page comprises HTML code.

8. The method of claim 5, comprising the steps of tokenizing the source web page by creating an ordered list of tags of the source web page, and tokenizing the target web page by creating an ordered list of tags of the target web page.

9. The method of claim 1, comprising the steps of, at least before the step of determining:
identifying a repeated sequence range within the source web page containing repeated sequences of tags,
reducing a size of the pre-region or a size of the post-region to within the repeated sequence range.

10. The method of claim 9, comprising the steps of:
identifying an instance range of an instance of a repeated sequence within the repeated sequence range;
reducing a size of the pre-region or a size of the post-region within the instance range.

11. The method of claim 1, comprising a step of parsing the source web page and the target web page to pair unpaired tags in each of the source web page and the target web page.

12. The method of claim 1, wherein the step of identifying the changed element in the target web page comprises the step of identifying a location of the changed element of the target web page within the target web page.

13. A computer implemented method of identifying a sought element within a target web page as a changed web element, comprising the step of:

comparing a one or more locators known to be associated with the sought element to a one or more locators of a one or more elements of the target web page;
determining that the one or more elements of the target web page are not associated with a locator that uniquely identifies the sought element within the target web page and matches a locator of the one or more locators known to be associated with the sought element; and,
in response to said determining,
identifying within a pre-region of the target web page a pre-region longest matching segment of the pre-region that matches a pre-region segment of a pre-region of a source web page, where the target web page comprises at least one change as compared to the source web page, the pre-region of the source web page comprises an area of the source web page before an encoded position of the sought element in the source web page, the pre-region of the target web page comprises an area of the target web page before the encoded position in the target web page;
identifying within a post-region of the target web page a post-region longest matching segment of the post-region that matches a post-region segment of a post-region of the source web page, where the post-region of the source web page comprises an area of the source web page after the encoded position, the post-region of the target web page comprises an area of the target web page after the encoded position in the target web page;
determining the pre-region longest matching segment is within a pre-defined distance of the post-region longest matching segment; and,
identifying the changed web element in the target web page that is between the pre-region longest matching segment and the post-region longest matching segment in response to the pre-region longest matching segment being determined to be within the pre-defined distance of the post-region longest matching segment.

14. The method of claim 13, wherein the step of determining the pre-region longest matching segment is within the pre-defined distance of the post-region longest matching segment, comprises the step of proceeding, starting with the pre-region longest matching segment is not within the pre-defined distance of the post-region longest matching segment, to reduce a size of the pre-region of the source web page and of the pre-region of the target web page by excluding the pre-region longest matching segment from the pre-region of the source web page and the pre-region of the target web page and to reduce a size of the post-region of the source web page and of the post-region of the target web page by excluding the post-region longest matching segment from the post-region of the source web page and the post-region of the target web page, with the reduced pre-regions and the reduced post-regions acting as an initial value for a next iteration, until the pre-region longest matching segment is within the pre-defined distance of the post-region longest matching segment.

15. A web element rediscovery system, comprising:
a memory;
a processor in communication with the memory;
the memory comprising a plurality of instructions stored thereon that are executable by the processor to cause the system to:
identify within a pre-region of a target web page a pre-region longest matching segment of the pre-region that matches a pre-region segment of a preregion of a source web page, where the target web page comprises at least one change as compared to the source web page, the pre-region of the source web page comprises an area of the source web page before an encoded position of a sought element in the source web page, the pre-region of the target web page comprises an area of the target web page before the encoded position in the target web page;

identify within a post-region of the target web page a post-region longest matching segment of the post-region that matches a post-region segment of the post-region of the source web page, the post-region of the source web page comprises an area of the source web page after the encoded position, the post-region of the target web page comprises an area of the target web page after the encoded position in the target web page;

determine the pre-region longest matching segment is within a pre-defined distance of the post-region longest matching segment; and, identify a changed web element in the target web page that is between the pre-region longest matching segment and the post-region longest matching segment in response to the pre-region longest matching segment being determined to be within the pre-defined distance of the post-region longest matching segment.

16. The system of claim 15, wherein the instructions executable by the processor to cause the system to determine the pre-region longest matching segment is within a pre-defined distance of the post-region longest matching segment comprise instructions executable by the processor to cause the system to proceed, starting with the pre-region longest matching segment is not within the pre-defined distance of the post-region longest matching segment, to reduce a size of the pre-region of the source web page and of the pre-region of the target web page by excluding the pre-region longest matching segment from the pre-region of the source web page and the pre-region of the target web page and to reduce a size of the post-region of the source web page and of the post-region of the target web page by excluding the post-region longest matching segment from the post-region of the source web page and the post-region of the target web page, with the reduced pre-regions and the reduced post-regions acting as an initial value for a next iteration, until the pre-region longest matching segment is within the pre-defined distance of the post-region longest matching segment.

17. The system of claim 15, wherein the instructions comprise instructions executable by the processor to cause the system to position encode the source web page and position encoding the target web page, wherein the encoded position of the sought element in the source web page is an encoded position index of the sought element, the pre-region of the source web page is an area of the source web page before the encoded position index of the sought element in the source web page, the post-region of the source web page is an area of the source web page after the encoded position index, the pre-region of the target web page is an area of the target web page before the encoded position index, the post-region of the target web page is an area of the target web page after the encoded position index.

18. The system of claim 15, wherein the instructions comprise instructions executable by the processor to cause the system to type encode the source web page and type encode the target web page, and wherein the pre-region longest matching segment is a pre-region longest matching segment of encoded values and the post-region longest matching segment is a longest matching segment of encoded values, and the instructions executable by the processor to cause the system to identify within a pre-region of a target web page a pre-region longest matching segment of the pre-region that matches a pre-region segment of a pre-region of a source web page comprise instructions executable by the processor to cause the system to compare the encoded values of the pre-region of the target web page to the encoded values of the pre-region of the source web page to identify the pre-region longest matching segment of encoded values of the pre-region that matches a pre-region segment of encoded values of the pre-region of the source web page; and, the instructions executable by the processor to cause the system to identify within a post-region of the target web page a post-region longest matching segment of the post-region that matches a post-region segment of the post-region of the source web page comprise instructions executable by the processor to cause the system to compare the encoded values of the post-region of the target web page to the encoded values of the post-region of the source web page to identify a post-region longest matching segment of encoded values of the post-region of the target web page that matches a post-region segment of encoded values of the post-region of the source web page.

19. The system of claim 18, wherein the instructions executable by the processor to cause the system to type encode the source web page and type encode the target web page comprise instructions executable by the processor to cause the system to:

assign opening tags a first encoding value, closing tags a second encoded value, and tags which do not have a closing tag by default a third encoded value;

produce a sequence of encoded values for the source web page corresponding to a sequence of tags within the source web page; and, produce a sequence of encoded values for the target web page corresponding to a sequence of tags within the target web page.

20. The system of claim 19, wherein the instructions executable by the processor to cause the system to type encode the source web page and type encode the target web page comprise instructions executable by the processor to cause the system to encode HTML tags from the target web page comprising HTML code and from the source web page comprising HTML code.

21. The system of claim 18, wherein the instructions comprise instructions executable by the processor to cause the system to tokenize the source web page by creating an ordered list of encoded tags of the source web page, and to tokenize the target web page by creating an ordered list of encoded tags of the target web page.

22. The system of claim 15, wherein the instructions comprise instructions executable by the processor to cause the system to:

identify a repeated sequence range within the source web page containing repeated sequences of tags; and, reduce a size of the pre-region or a size the post-region to within the repeated sequence range.

23. The system of claim 22, wherein the instructions comprise instructions executable by the processor to cause the system to:

identify an instance range of an instance of a repeated sequence within the repeated sequence range; and, reduce a size of each of the pre-regions or a size of each of the post-regions within the instance range.

24. The system of claim 15, wherein the instructions comprise instructions executable by the processor to cause the system to parse the source web page and the target web page to pair unpaired tags in each of the source web page and the target web page.

25. The system of claim 15, wherein the instructions comprise instructions executable by the processor to cause the system to identify a location of the changed web element of the target web page within the target web page.

26. A web element rediscovery computer system, comprising:

a memory;

a processor in communication with the memory;

the memory comprising a plurality of instructions stored thereon that are executable by the processor to cause the system to:

compare a one or more locators known to be associated with a sought element to a one or more locators of a one or more elements of a target web page;

determine whether the one or more elements of the target web page are associated with a locator that uniquely identifies the sought element within the target web page and matches a locator of the one or more locators known to be associated with the sought element;

identify within a pre-region of the target web page a pre-region longest matching segment of the pre-region that matches a pre-region segment of a pre-region of a source web page, where the target web page comprises at least one change as compared to the source web page, the pre-region of the source web page comprises an area of the source web page before an encoded position of the sought element in the source web page, the pre-region of the target web page comprises an area of the target web page before the encoded position in the target web page;

identify within a post-region of the target web page a post-region longest matching segment of the post-region that matches a post-region segment of the post-region of the source web page, where the post-region of the source web page comprises an area of the source web page after the encoded position, the post-region of the target web page comprises an area of the target web page after the encoded position in the target web page;

determine the pre-region longest matching segment is within a pre-defined distance of the post-region longest matching segment; and, identify a changed web element in the target web page that is between the pre-region longest matching segment and the post-region longest matching segment in response to the pre-region longest matching segment being determined to be within the pre-defined distance of the post-region longest matching segment.

27. The system of claim 26, wherein the instructions executable by the processor to cause the system to determine the pre-region longest matching segment is within a pre-defined distance of the post-region longest matching segment comprise instructions executable by the processor to cause the system to proceed, starting with the pre-region longest matching segment is not within the pre-defined distance of the post-region longest matching segment, to reduce a size of the pre-region of the source web page and of the pre-region of the target web page by excluding the pre-region longest matching segment from the pre-region of the source web page and the pre-region of the target web page and to reduce a size of the post-region of the source web page and of the post-region of the target web page by excluding the post-region longest matching segment from the post-region of the source web page and the post-region of the target web page, with the reduced pre-regions and the reduced post-regions acting as an initial value for a next iteration, until the pre-region longest matching segment is within the pre-defined distance of the post-region longest matching segment.

28. The system of claim 26, wherein the instructions comprise instructions executable by the processor to cause the system to position encode the source web page and position encoding the target web page, wherein the encoded position of the sought element in the source web page is an encoded position index of the sought element, the pre-region of the source web page is an area of the source web page before the encoded position index of the sought element in the source web page, the post-region of the source web page is an area of the source web page after the encoded position index, the pre-region of the target web page is an area of the target web page before the encoded position index, the post-region of the target web page is an area of the target web page after the encoded position index.

29. The system of claim 26, wherein the one or more locators known to be associated with the sought element and the one or more locators of the one or more elements of the target web page each comprise an attribute of an html tag.

30. The system of claim 26, wherein the one or more locators known to be associated with the sought element and the one or more locators of the one or more elements of the target web page each comprise an Xpath of an html tag.

31. The system of claim 26, wherein the one or more locators known to be associated with the sought element and the one or more locators of the one or more elements of the target web page each comprise a CSS selector associated with an html tag.

32. The system of claim 26, wherein the one or more locators known to be associated with the sought element and the one or more locators of the one or more elements of the target web page each comprise an image associated with an html tag.

33. The system of claim 32, wherein the instructions executable by the processor to cause the system to compare a one or more locators known to be associated with a sought element to a one or more locators of a one or more elements of a target web page comprise instructions executable by the processor to cause the system to compare a perceptual hash value of the image of the one or more elements of the target web page to at least one perceptual hash value of the image known to be associated with the sought element.

* * * * *